United States Patent
Szabó et al.

(10) Patent No.: US 12,436,817 B2
(45) Date of Patent: Oct. 7, 2025

(54) JOINT CONSIDERATION OF SERVICE FUNCTION PLACEMENT AND DEFINITION FOR DEPLOYMENT OF A VIRTUALIZED SERVICE

(71) Applicant: TELEFONAKTIEBOLAGET L M ERICSSON (PUBL), Stockholm (SE)

(72) Inventors: Róbert Szabó, Budapest (HU); Balázs Németh, Nagyalasony (HU); Ákos Recse, Halasztelek (HU); Michael Martin, Wake Forest, NC (US); Massimiliano Maggiari, Pleasanton, CA (US); Malgorzata Svensson, Nättraby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 554 days.

(21) Appl. No.: 17/776,483

(22) PCT Filed: Nov. 13, 2019

(86) PCT No.: PCT/IB2019/059723
§ 371 (c)(1),
(2) Date: May 12, 2022

(87) PCT Pub. No.: WO2021/094812
PCT Pub. Date: May 20, 2021

(65) Prior Publication Data
US 2022/0382598 A1  Dec. 1, 2022

(51) Int. Cl.
*G06F 9/455* (2018.01)
*G06F 9/50* (2006.01)

(52) U.S. Cl.
CPC ......... *G06F 9/5077* (2013.01); *G06F 9/5066* (2013.01); *G06F 2209/503* (2013.01)

(58) Field of Classification Search
CPC .................................................. G06F 9/5077
(Continued)

(56) References Cited

U.S. PATENT DOCUMENTS 8,276,140 B1 * 9/2012 Beda, III .............. G06F 9/5077
718/1
9,430,262 B1 * 8/2016 Felstaine ............. G06F 9/45558
(Continued)

FOREIGN PATENT DOCUMENTS

EP   2849064 B1   12/2016

OTHER PUBLICATIONS

Balázs Németh; Balázs Sonkoly; Matthias Rost; Stefan Schmid—Efficient service graph embedding: A practical approach, Publication date: Nov. 10, 2016. IEEE Conference on NFV and SDN.
(Continued)

*Primary Examiner* — Mehran Kamran
(74) *Attorney, Agent, or Firm* — ERICSSON INC.

(57) ABSTRACT

A method and system of deployment of a virtualized service on a cloud infrastructure while taking into consideration variability/elasticity of the cloud resources are described. A first service function specification is selected. Candidate computing systems and candidate links are determined. The determination of the candidates is performed based on the availability and characteristics of the computing systems and the network resources in the cloud infrastructure which includes varying characteristics. A first computing system and one or more links are determined from the candidates for placing the first service function in the cloud infrastructure.

12 Claims, 18 Drawing Sheets

(58) Field of Classification Search
USPC .......................................................... 718/1
See application file for complete search history.

(56) References Cited

U.S. PATENT DOCUMENTS

| | | | | |
|---|---|---|---|---|
| 9,853,869 | B1* | 12/2017 | Shaham | H04L 41/5054 |
| 10,176,003 | B2 | 1/2019 | Zeng | |
| 2015/0082308 | A1* | 3/2015 | Kiess | G06F 9/5077 |
| | | | | 718/1 |
| 2015/0172115 | A1* | 6/2015 | Nguyen | H04L 41/0896 |
| | | | | 709/226 |
| 2015/0326448 | A1* | 11/2015 | Chaudhary | G06Q 20/14 |
| | | | | 705/40 |
| 2015/0326535 | A1* | 11/2015 | Rao | H04L 41/5054 |
| | | | | 726/15 |
| 2016/0337172 | A1* | 11/2016 | Yu | H04L 12/4641 |
| 2017/0289060 | A1* | 10/2017 | Aftab | H04L 67/1097 |
| 2017/0318097 | A1* | 11/2017 | Drew | H04L 41/0897 |
| 2018/0124254 | A1* | 5/2018 | Shaw | H04L 12/1417 |
| 2018/0287894 | A1* | 10/2018 | Senarath | H04L 41/40 |
| 2018/0316559 | A1* | 11/2018 | Thulasi | H04L 41/40 |
| 2018/0316620 | A1* | 11/2018 | Llorca | H04L 47/70 |
| 2020/0244546 | A1* | 7/2020 | Tidemann | H04L 41/5009 |
| 2020/0244551 | A1* | 7/2020 | Tidemann | H04L 67/1008 |
| 2021/0135957 | A1* | 5/2021 | Thakkar | H04L 43/0876 |
| 2022/0225321 | A1* | 7/2022 | Moore | H04L 47/83 |
| 2022/0382598 | A1* | 12/2022 | Szabó | G06F 9/5072 |
| 2022/0391258 | A1* | 12/2022 | Szabó | G06F 9/455 |

OTHER PUBLICATIONS

Juliver Gil Herrera and Juan Felipe Botero—Resource Allocation in NFV: A Comprehensive Survey, Publication date: 2016, IEEE Transactions on Network and Service Management.

Maximilian Hille, Daniel Klemm, Luisa Lemmermann—CRISP Research—Cloud Computing Vendor & Service Provider Comparison, 2017.

Research Brief on SD-WAN Networking for Multi-Cloud-An SD-WAN Perspective, 2018.

Cho, D., et al., "Virtual Network Function Placement: Towards Minimizing Network Latency and Lead Time", 2017 IEEE 9th International Conference on Cloud Computing Technology and Science, Dec. 11-14, 2017, 8 Pages.

* cited by examiner

JOINT CONSIDERATION OF SERVICE FUNCTION PLACEMENT AND DEFINITION FOR DEPLOYMENT OF A VIRTUALIZED SERVICE

This application is a 371 of International Application No. PCT/IB2019/059723, filed Nov. 13, 2019, the disclosures of which are fully incorporated herein by reference.

TECHNICAL FIELD

Embodiments of the invention relate to the field of computing; and more specifically, to the deployment of service functions on a cloud infrastructure.

BACKGROUND ART

A virtualized service involves multiple service functions and corresponding network connections that couple these service functions. The instantiation of a virtualized service on a cloud infrastructure involves the deployment of the service functions on the compute and network resources of the cloud infrastructure. Deployment and placement of virtualized service functions on cloud infrastructure is a complex problem. Several constraints need to be considered when deploying and placing the virtualized service functions. Latency constraints, cost constraints, and capability of the computing resources are some examples of constraints that need to be considered. Complexity of the placement and deployment of the virtualized service functions is more pronounced when the underlying cloud infrastructure that is to host the services is distributed across multiple geographical locations with varying hardware, software, and networking capabilities.

In some existing service offerings today, the deployment of virtualized service functions on distributed computing systems is an ad-hoc manual process. In a manual deployment process, there is no single, end-to-end process to guide the overall deployment of the service across the cloud infrastructure.

SUMMARY

One general aspect includes a method of deployment of a virtualized service on a cloud infrastructure that includes computing systems and network resources coupling the computing systems, the method including: (a) determining availability and characteristics of one or more of the computing systems and the network resources, where the characteristics include varying characteristics which define potential variability in the computing systems and the network resources of the cloud infrastructure; (b) determining, based on the availability and characteristics of the computing systems and the network resources in the cloud infrastructure, a set of the computing systems and a set of links from the network resources that are candidates for hosting a first service function from service functions that form a virtualized service; (c) determining a first subset of the set of the computing systems that have second sets of attributes compatible with a first set of attributes of the first service function; and (d) determining a first subset of links from a first set of links that have first sets of link attributes compatible with the first set of attributes of the first service function; (e) determining for each computing system of the first subset of the computing systems an associated cost for deployment of the first service function, where the associated cost includes one or more varying costs for usage of the computing system based on the varying characteristics; (f) determining for each link of the first subset of links an associated link cost for deployment of the first service function, where the associated link cost includes one or more varying link costs for usage of the link based on the varying characteristics; and (g) selecting a first computing system from the first subset of the computing systems and one or more links of the first subset of links based on the associated costs and the associated link cost for placing the first service function in the cloud infrastructure.

One general aspect includes an article of manufacture for deployment of a virtualized service on a cloud infrastructure that includes computing systems and network resources coupling the computing systems, the article of manufacture including: a non-transitory machine-readable storage medium that provides instructions that, if executed by a processor, will cause the processor to: (a) determine availability and characteristics of one or more of the computing systems and the network resources, where the characteristics include varying characteristics which define potential variability in the computing systems and the network resources of the cloud infrastructure; (b) determine, based on the availability and characteristics of the computing systems and the network resources in the cloud infrastructure, a set of the computing systems and a set of links from the network resources that are candidates for hosting a first service function from service functions that form a virtualized service; (c) determine a first subset of the set of the computing systems that have second sets of attributes compatible with a first set of attributes of the first service function; (d) determine a first subset of links from a first set of links that have first sets of link attributes compatible with the first set of attributes of the first service function; (e) determine for each computing system of the first subset of the computing systems an associated cost for deployment of the first service function, where the associated cost includes one or more varying costs for usage of the computing system based on the varying characteristics; (f) determine for each link of the first subset of links an associated link cost for deployment of the first service function, where the associated link cost includes one or more varying link costs for usage of the link based on the varying characteristics; and (g) select a first computing system from the first subset of the computing systems and one or more links of the first subset of links based on the associated costs and the associated link cost for placing the first service function in the cloud infrastructure.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
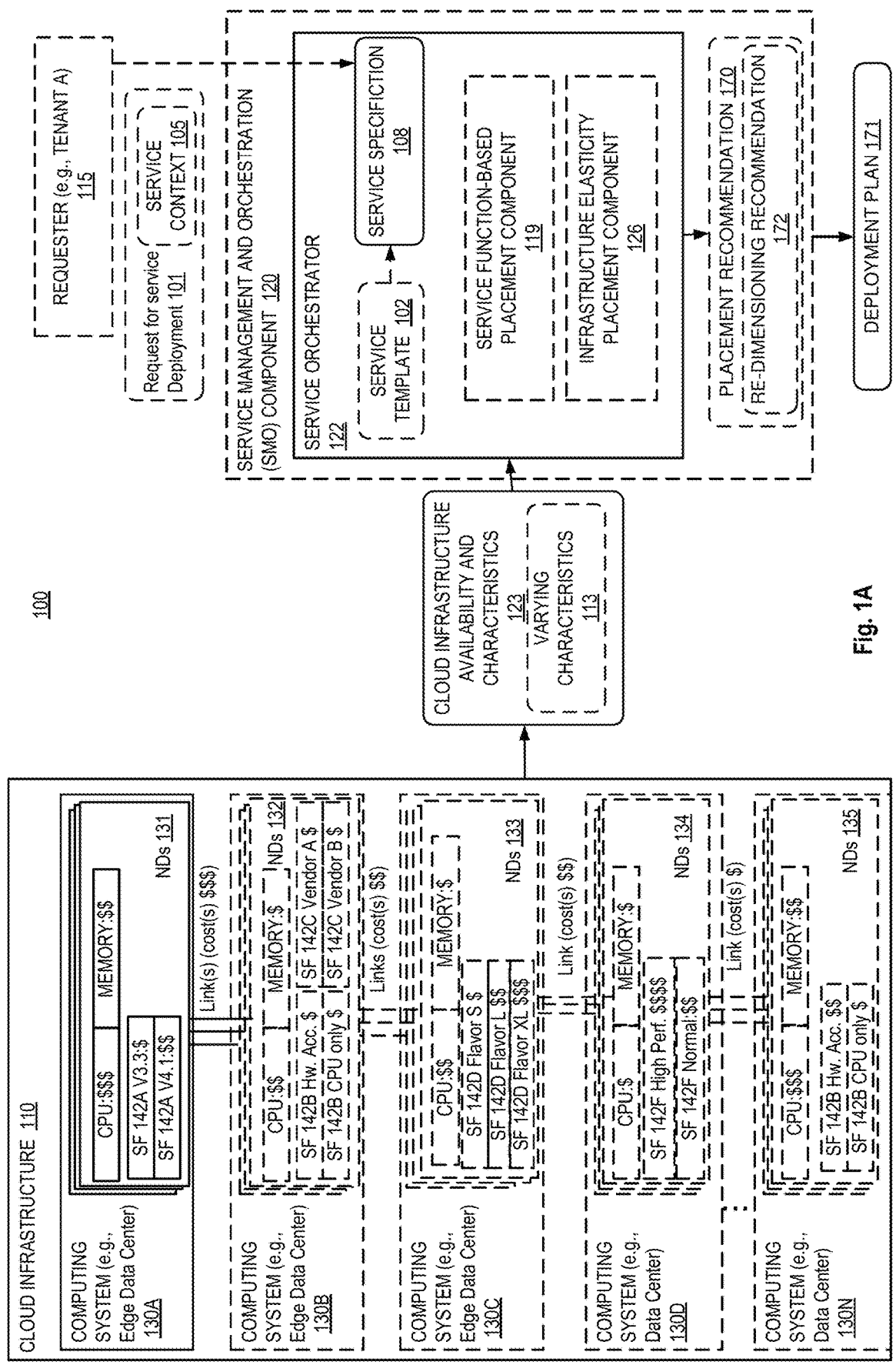
FIG. 1A illustrates a block diagram of an exemplary system for deployment of a virtualized service, in accordance with some embodiments.

The following description describes methods and apparatus for enabling service functions deployment on a cloud infrastructure. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Existing solutions of deployment of virtualized services:

As used herein, a virtualized service refers to a set of functions and connections between these functions, which when instantiated on a network and computing infrastructure offer a service that has a well-defined behavior to one or more customers. As used herein, a service function refers to a virtualization of a function of a service that has a well-defined functional behavior. In some embodiments, the service function can be a network service function.

Examples of network functions include 3rd Generation Partnership Project (3GPP) network elements (e.g., Mobility Management Entity (MME), Serving Gateway (S-GW), and Packet Data Network Gateway (PDN-GW or P-GW)), Dynamic Host Configuration Protocol (DHCP) servers, firewalls, and other entities that provide network services. As used herein, a service function type refers to a conceptual definition of a service function. As used herein, a service specification/descriptor refers to a set of service function specifications/descriptor of the service functions that form the virtualized service. A service specification/descriptor is used when creating an instance of the service. As used herein, a service function specification/descriptor refers to a detailed description of the characteristics of a service function type as defined based on a template for the service function and a context for the service function, where the service context is determined for one or more customers of the service. A service function specification/descriptor is used when creating an instance of a given service function type. A service function specification/descriptor may include various information about the service function type that it describes (e.g., default values for attributes, boundaries for attributes, whether an attribute is read-only or read-write (which may depend on the reference point where an instance is accessed), a version of the service function if several versions are available for a given service function type). As used herein, a service function instance refers to an instantiation of a given service function type (e.g., service function instance in Internet Engineering Task Force (IETF) terms and Virtualized Network Function (VNF) instance in European Telecommunications Standards Institute (ETSI) terms). As used herein, consumer-side refers to the entity that uses the capabilities offered by a service function instance and provider-side refers to the entity that offers access to a service function instance. As used herein, a service context refers to a set of parameters and service policies that can be determined by a customer or a service provider based on the customer's request for service, where the service context is for defining the requested service. The service context may be determined based on the service level agreement that the customer has agreed upon with the provider of the service. The service context can be expressed in terms of input parameters and policies that are defined for the service requested by the customer.

Deployment of a virtualized service involves the selection of the characteristics of the service functions that form the service and the placement of these service functions on computing, storage, and networking resources of the cloud infrastructure to be instantiated to offer the service.

Some existing approaches for deployment of a virtualized service in a distributed cloud environment rely on a model-driven system that uses a master service orchestrator, which unpacks a cloud services archive file to retrieve and execute a deployment plan. The cloud services archive file describes topological requirements and the cloud computing and networking requirements of the virtualized service. The system extracts from the cloud services archive file a cloud resource configuration template, a cloud network configuration template, and an application dependency graph to determine the exact order and all the execution parameters of deployment steps required to instantiate the multiple functions of the virtualized service. In this approach, the cloud services archive file determines completely the placement sites (distributed cloud computing systems) and service functions characteristics of each one of the virtualized service functions. However, this approach has the significant disadvantage that it only executes an already existing deployment plan as all placement locations and characteristics of the service functions are defined in the cloud services archive file. The burden of designing the service component locations and flavor selection is delegated to the creator (which in many present-day systems is a person) of the cloud services archive file.

Another approach of deployment of a virtualized service in a distributed cloud environment claims the design of a placement method based on an Integer Linear Program (ILP) which outputs the selected locations of the service functions over an infrastructure of a distributed cloud. The approach further chooses where to route the traffic between the service functions, which can be realized over a software defined network (SDN) architecture. The approach matches the functional and capacity requirements of each service function against the distributed cloud infrastructure. However, this approach does not consider the selection of the characteristics of the service functions when performing the placement. In this approach there is a static set of service functions that are defined prior to being placed. Some other approaches rely on heuristics for enabling deployment of service functions. A greedy backtracking search-based approach is an example of meta-heuristic that can be used for tackling the service functions placement problem.

To adapt to today's offerings in cloud computing environments, virtualized services can be deployed on different types of data centers and cloud computing systems (e.g., edge-clouds, etc.), multiple execution environments, different hardware platforms, and need to support rolling upgrades of service functions, geographical constraints, policy constraints associated with the service, etc. Further, in service virtualization platforms several changes can continuously occur. A virtualized service and the system used for deployment of the service may undergo one or more of hardware upgrades, execution environment upgrades, service component updates, composite service updates, packaging updates, varying co-deployment and interference, updates of deployment locations, etc. In addition, a service may need to be deployed differently for different customers based on the location of the customer, the characteristics of the service functions available at the location of the customer, and the compute and network resources available for deploying the service for that particular customer. Therefore, statically configured service specifications are inadequate for keeping up with the changes and variations that need to be considered when deploying a set of service functions.

In some deployment approaches of a virtualized service, a Lifecycle Manager (LCM) (e.g., a virtual network functions manager (VNFM)) may be used to select decomposition options, substitutions, software versions and deployment flavors of the service functions that form the virtualized service. Such selection can be referred to as service functions definition and may come before (e.g., indirect mode VNFM) or after (e.g., direct mode VNFM) the placement decision. The placement decision includes the determination of a cloud computing and/or networking resource on which the service function is to be hosted. For example, the placement decision for a service function may include the determination of a computing system that is to host the service function. In some instances, the placement decision further includes the selection of a network resource (such as a Layer 3 Virtual Private Network (L3VPN)) for coupling the service function hosted on the computing resource (e.g., a data center) with another service function that is hosted on another computing resource (e.g., the same or a different data center).

In some instances the service functions definition is performed before the placement decision that determines where the service function is to be deployed. However, this approach presents a significant disadvantage. When a set of service functions are collectively defined prior to their placement, the placement of these service functions can become challenging as the best placement location for these service functions that satisfy the service requirements (such as latency constraints, location, and topological dependencies) may not support the selected service functions. As a non-limiting example, to satisfy a service requirement of the requested service (such as the latency requirement) a particular edge data center needs to be selected for a given service function of the requested service, however, the selected version of the service function that was identified during the service definition procedure may not be suitable at that edge cloud computing system. In another non-limiting example, three network functions (A, B, and C) are to be deployed with a maximum latency of 5 msec between the service functions A and B and between the service functions B and C requiring the three service functions to be deployed in a given computing system. However, in some instance for reasons such as lack of resource availability in the computing system, one of the service functions cannot be deployed causing the definition of all of the service functions to be revisited. However, the root-cause of the failure of the placement of the three service functions cannot be indicated to the service function definition component without knowing the placement options. Therefore, the service component definition would need to perform several iterations of service functions definitions, which are tentatively placed onto the available computing resources. The definition of the service functions is repeated as long as the placement is not successful, which is highly inefficient even for simple services.

In some instances the service function definition is performed after the placement decision. In these instances, a computing system and/or link is selected for hosting a service function prior to the characteristics of the service function being defined. This is performed for all of the service functions that are to be deployed, such that the location (host) and link are selected for all the service functions prior to these functions being defined. The service functions are then defined after the placement decision. In this case, some of the selected locations may not support the given set of requirements of the service functions causing a deployment failure. The root cause of the deployment failure may not necessarily be a function definition which cannot be selected, but instead the placement decision that causes the deployment failure. For example, two service functions are placed at a first computing system and then their characteristics are selected causing a failure of placement as the first computing system could not support deployment of the two service functions as defined. According to these approaches, the system may try to redefine the service functions and perform another deployment attempt based on the same placement decisions, which may result in another failure. However, the solution might have been to modify the placement decision and causing a first of the service functions to be placed on a first computing system and a second of the service functions to be placed at another computing system and resulting in a successful deployment without redefinition of the service functions.

Automatic determination of a deployment plan for a virtualized service:

Deployment of a virtualized service that includes multiple service functions typically involves the definition of the service functions and the placement of each one of the service functions that is to be deployed onto a cloud computing system (e.g., a data center). The deployment of the service functions further includes the selection of links across the transport infrastructure for coupling the different service functions. Automation of the deployment of service functions over a cloud infrastructure is the automatic allocation of each one of the service functions and the links connecting the service functions onto the computing and networking resources without any (or with a limited) manual intervention of a person during this process. The automatic deployment of the service functions can be particularly advantageous in scenarios with large numbers of service functions and/or computing systems that are distributed over several locations.

FIG. 1A illustrates a block diagram of an exemplary system for deployment of a virtualized service, in accordance with some embodiments. The system 100 includes a cloud infrastructure 110 and a service orchestrator 122. In some embodiments, the service orchestrator 122 may be included in a service management and orchestration system or component 120. The system 100 is operative to enable automatic deployment of a virtualized service on the cloud infrastructure 110. The virtualized service typically includes a set of service functions that are to be deployed in order to provide a service to a service requester 115. The requested service satisfies a particular business need and adheres to policies that define operational characteristics and access controls/security. The deployment of such a service on the cloud infrastructure 110 involves utilization of one or more service functions that satisfy the service policy and operational requirements.

The cloud infrastructure 110 provides the hardware and software components which build up the environment in which service functions of the virtualized service can be deployed, managed, and executed. The cloud infrastructure 110 includes hardware resources, which may include, but is not limited to, computing hardware (e.g., processors), storage hardware (e.g., Random Access Memory (RAM) and hard disks), and networking hardware (e.g., network interface cards). The cloud infrastructure 110 includes a set of computing systems 130A-N. Each of the computing systems is located at a given location may include a respective set of network devices (e.g., NDs 131, NDs 132, NDs 133, NDs 134, and NDs 135) on which one or more service functions can be deployed. Each one of the computing systems 130A-N may have costs associated with each of the hardware and software resources that they offer. For example, computing system 130A may have a first cost of $$$ associated with using the computing resources (CPU usage) of the data center. The edge computing system 130A may have a cost of $$ associated with using the computing memory resources. The edge computing system 130A may further include an indication of characteristics and/or versions of a service function that can be supported by the edge computing system 130A. For example, the edge computing system 130A can include an indication that a first service function of type 142A can be supported if deployed with version v3.3 or version v4.1. In the illustrated example, each of the versions that are supported by the first edge computing system 130A is associated with a different cost.

In some embodiments, the cloud infrastructure 110 may include computing resources at a single location (e.g., edge computing system 130A). In other embodiments, the cloud infrastructure 110 may include multiple computing systems located at different locations remote from one another.

The service management and orchestration component (SMO) 120 may include one or more additional components (not illustrated) that may be used in the management and orchestration of the service functions that are deployed on the cloud infrastructure 110. For example, the SMO component 120 may include a virtual function manager, and/or a virtualized infrastructure manager. The virtual function manager is responsible for service function lifecycle management (e.g., instantiation, update, query, scaling, and termination). The virtual function manager can use the recommended deployment plan 171 to instantiate the service functions onto the cloud infrastructure 110. The virtualized infrastructure manager is responsible for controlling and managing the interaction of a service function with computing, storage, and network resources under its authority, as well as the virtualization of these resources. In some embodiments, the virtualized infrastructure manager can be located at the same location as the cloud computing resources (e.g., within the computing systems). The multiple components of the SMO component 120 can be implemented as hardware, software, or firmware, or any combination thereof.

The service orchestrator 122 is responsible for the orchestration and management of the cloud infrastructure 110 and realizing virtualized services on the cloud infrastructure 110. In some embodiments, the service orchestrator 122 includes a service function-based placement component (SFPC) 119. The service orchestrator 122 is operative to determine a service specification 108 based on a service template 102 and a service context 105. The service orchestrator 122 is operative to determine for each service function identified in the service specification 108, a location in the cloud infrastructure that is to host the service function. The determination of the host takes into account the characteristics of the service functions as defined in the service specification 108. The service orchestrator 122 simultaneously considers the cloud infrastructure availability and characteristics 123 when determining the host on which the service function is to be deployed. The service orchestrator takes as input a service specification 108 and the cloud infrastructure availability and characteristics 123 and determines through an iterative process a host for each one of the service functions in the service specification 108. The service orchestrator 122 determines a placement recommendation 170 for the service functions that form the requested service. The placement recommendation 170 contains an indication of the assignment of each one of the service functions that form the virtualized service (e.g., defined by service function specifications 152A-G) onto one or more of the computing systems 130A-N of the cloud infrastructure. The placement recommendation 170 further indicates one or more links that are to be used to couple the service functions through the network resources of the cloud infrastructure. The links can be virtual or physical network connections that can be used to couple and forward traffic between the multiple service functions (e.g. L3VPN connecting two zones of virtual infrastructure managers (VIMs) over a WAN). In some embodiments, as will be described in further detail below, the placement recommendation 170 may include a re-dimensioning recommendation 172. The re-dimensioning recommendation 172 includes possible recommendations to modify capacity of cloud resources (e.g., computing resources and/or networking resources) of the cloud infrastructure.

The placement recommendation 170 can then be used by one or more components of the SMO component 120 to determine a deployment plan, which can be used to deploy the service on the cloud infrastructure 110. The deployment plan may include a sequence of ordered elementary steps, which are understood by the underlying infrastructure managing elements (e.g., VIMs, network function virtualization orchestrators (NFVOs), Wide Area Infrastructure Manager (WIM), and/or network manager, etc.) to deploy the service on the cloud infrastructure and to provision the service to a ready-to-use status.

Figure 1B:
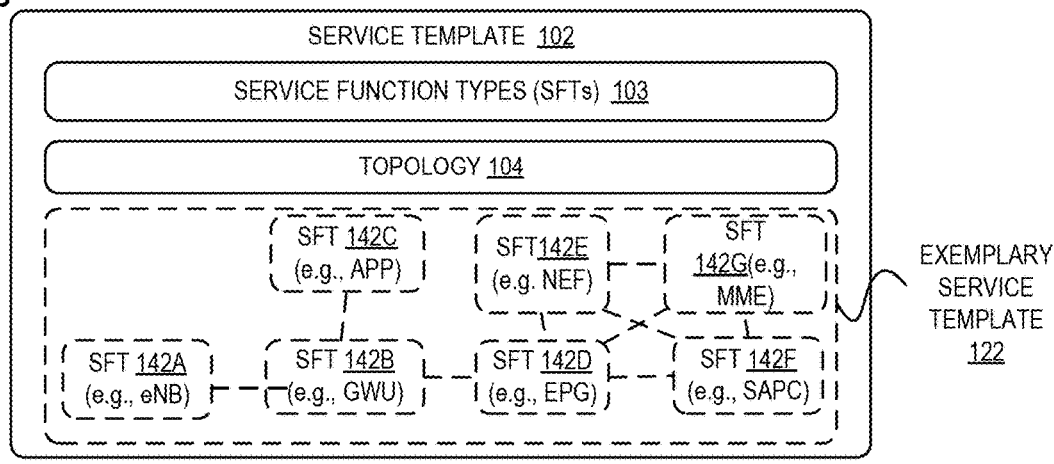
FIG. 1B illustrates a block diagram of an exemplary service template that can be used in some embodiments.

FIG. 1B illustrates a block diagram of an exemplary service template that can be used in some embodiments. The service template 102 includes a set of service function types 103 and a topology of the network connections (also referred to as links) coupling the service functions 104. A service function type refers to a conceptual definition of a service function. The topology 104 determines the type of network connections that link the multiple service function types 103. FIG. 1B includes an exemplary service template 122 that can be used. The exemplary service template 122 includes a set of service function types 142A-G that form a service template. The service function types can be types of network service functions such as 3GPP eNodeB (radio node), a serving gateway (GWU), network exposure function (NEF), evolved packet gateway (EPG), a mobility management entity (MME), service aware policy controller (SAPC), or other types of service function such as various Layer 7 application (App). The topology 104 includes a set of connections that link the multiple service functions and associated requirements for these connections. For example, the set of connections can be a set of VPN overlay connections that couple the multiple service function types. In the illustrated exemplary service template 122, a first service function type 142A is coupled with a second service function type 142B. The second service function type 142N is coupled with SFT 142A, SFT 142C, and with SFT 142D. SFT 142D is coupled with SFT 142B, SFT 142E, SFT 142G, and SFT 142F. SFT 142E is coupled with SFT 142D, SFT 142F, and SFT 142G. SFT 142F is coupled with SFT 142E, SFT 142D, and SFT 142G. SFT 142G is coupled with SFT 142F, SFT 142E, and SFT 142D. The topology may include for each connection a set of attributes and parameters that define the connection.

Figure 1C:
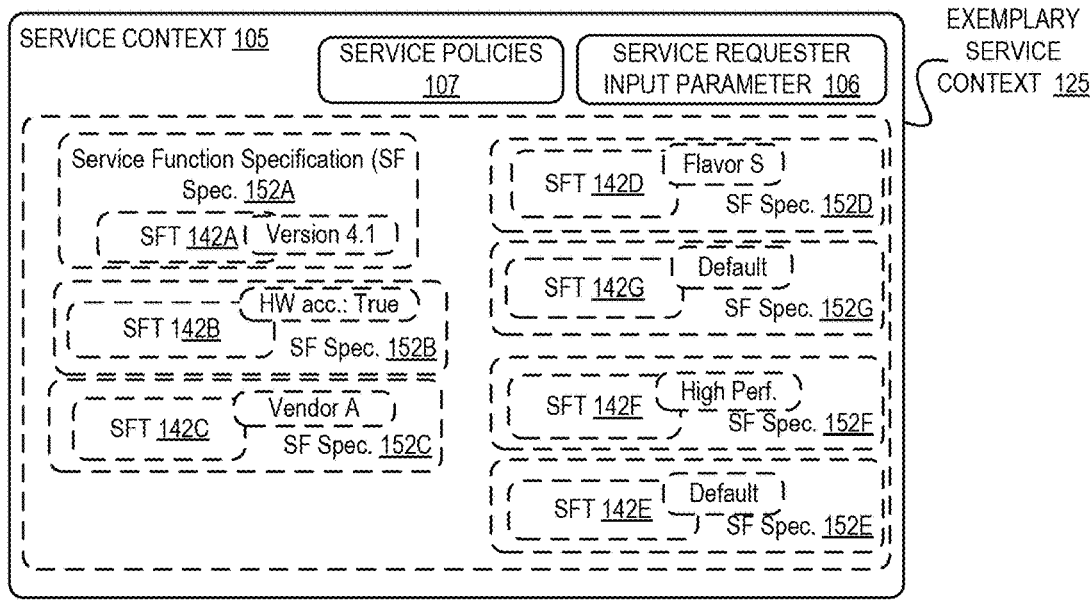
FIG. 1C illustrates a block diagram of an exemplary service context than can be used in some embodiments.

FIG. 1C illustrates a block diagram of an exemplary service context than can be used in some embodiments. The service context 105 includes input parameters 106 for the service requester and service policies 107. The input parameters define the service as requested or desired by the service requester 115. For example, the input parameters may be determined based on a set of features or service options selected by the requester based on the service offering. In some embodiments, the input parameters 106 may further determine costs associated with each one of the parameters/attributes requested by the service requester 115 or more generally a cost associated with the requested service. The service policies 107 may be determined by the provider based on the agreement with the service requester and/or based on regulations defined by regulation and authority agencies. The service context 105 can be expressed as a set of service function specifications/descriptors 152A-G for the service functions types requested by a particular customer of the service such as requester 115 based on the input parameter 106 and the service policies 107.

Each service function specification 152A-G may include various information about the service function type that it describes defined by a set of attributes in the service function specification. The information may include default values for attributes, boundaries for attributes, whether an attribute is read-only or read-write, etc. In the illustrated example, each one of the service function specifications (SF Spec. 152A-G) includes a type of the service function that is specified (SFT 142A-G) and one or more attributes that identify requirements and constraints for the service function. In some embodiments, the requirements can be determined based on the service policies 107 and the input parameters 106. In some embodiments, the attributes may include an attribute for identifying one or more versions of the service function if several versions are available for a given service function type, an attribute for identifying a vendor of the service function, etc. In some embodiments, the service specifications 152A-G may further include attributes that define other types of requirements that need to be satisfied when the virtualized service is deployed. The attributes can indicate geographical constraints for the deployment of the virtualized service. The geographical constraints can result from one or more of a policy established for the service, administrative considerations defined by the service provider, the location of the customer, and/or the location of the service that is to be provided. In some embodiments, the same geographical constraints may apply to all of the service functions forming the service. Alternatively, different geographical constraints may apply to two or more of the service constraints. The geographical constraints may indicate a geographical region or regions where a service function can be deployed. Alternatively, the geographical constraints may indicate one or more geographical regions where the service function cannot be deployed. Additionally, an attribute can be representative of latency constraints for network traffic between two or more of the service functions. In some embodiments, the same latency constraints may need to be satisfied between the multiple service functions. Alternatively or additionally, different latency constraints may need to be satisfied between different pairs of service functions. The requirements may further include additional optional requirements such as an indication of whether the service function is to be implemented with or without hardware acceleration. In some embodiments, each service function specification can include one or more of the attributes described above that define the service function to deploy. In some embodiments, additional attributes can be used without departing from the scope of the embodiments described herein. In some embodiments for each service function a type of attribute may include a range of possible options for that service function. For example, based on a service agreement of the customer, the service can be provided by selecting two or more versions of a service function for that customer (e.g., either one of multiple versions can be instantiated for a service function and would satisfy the service agreement established with the customer). In another example, no version may be selected indicating that any version of the service function can be instantiated for providing the service to the customer.

Figure 1D:
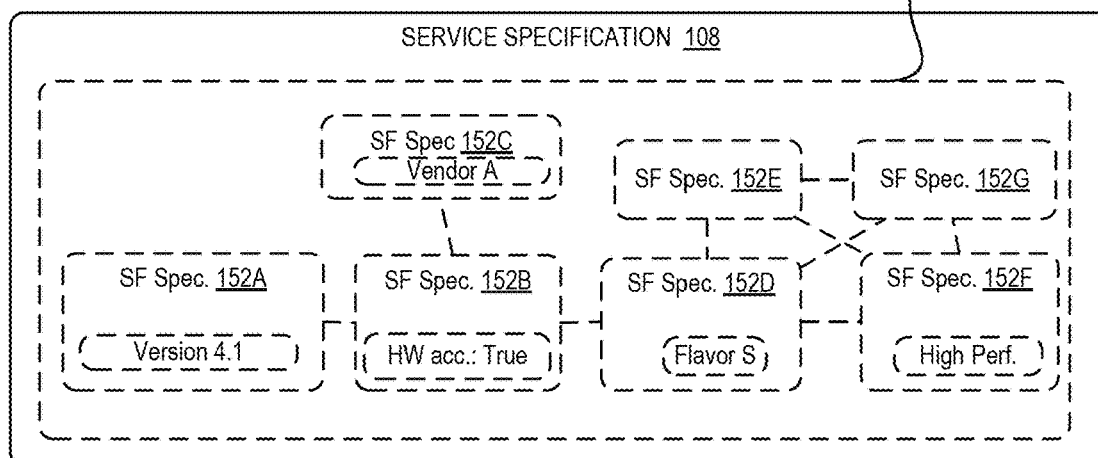
FIG. 1D illustrates a block diagram of an exemplary service specification that results from a service template and a service context in some embodiments.

FIG. 1D illustrates a block diagram of an exemplary service specification that results from a service template and a service context in some embodiments. As used herein, a service specification/descriptor 108 refers to a detailed description of the characteristics of a service. The service specification includes a detailed description of the characteristics of the service functions (service function specifications/descriptors) that form the service. The service specification is determined based on the service template 102 and the service context 105. The determination of the service specification may include at least in part assigning values of the attributes identified in the service context to attributes of the service template. Alternatively or additionally, the determination of the service specification may include merging values of attributes from the service context with values of attributes from the service template. The service specification is then used for determining a deployment plan for the virtualized service and for deploying the service based on the deployment plan.

Joint consideration of service function placement and definition for deployment of a virtualized service:

The embodiments described herein present a solution for enabling automatic deployment of a virtualized service based on joint consideration of service function placement and service function definition. In the following embodiments, a service orchestration workflow is presented, which considers joint optimization of placement decision (e.g., VNF embedding) and service function definition when establishing a placement recommendation for a virtualized plan.

A method and system of deployment of a virtualized service on a cloud infrastructure are described. The cloud infrastructure includes computing systems and network resources coupling the computing systems. In one embodiment, a first service function specification of a first service function is selected from service function specifications of service functions that form the virtualized service. A determination of a set of the computing systems and a set of the links from the network resources is performed based on availability and characteristics of the computing systems and the network resources in the cloud infrastructure. A selection a first computing system of the set of the computing systems to be assigned to host the first service function and one or more links of the set of links that couple the first computing system with one or more other computing systems of the computing systems is performed based on the first service function specification. In response to determining that there is one or more of the service functions that are not assigned to be hosted on one of the computing systems, the selection of a service function and the determination of a computing system and links are repeated for each of the remaining functions until all of the service functions are assigned to computing and networking resources in the cloud infrastructure. In responsive to determining that all of the service functions are assigned to a second set of computing systems in the cloud infrastructure, a deployment plan is output. The deployment plan is to be used for instantiating the service functions on the cloud infrastructure. The deployment plan indicates for each one of the service functions a corresponding one of the second set of computing systems and a second set of links from the one or more links that couple the second set of computing systems.

The embodiments presented herein enable automatic deployment of a virtualized service that includes a set of service functions to be deployed on cloud infrastructure. A service orchestrator is operative to determine a placement recommendation for deploying the set of service functions. The placement recommendation satisfies constraints given by the service request and service requirements (which may come from service component specifications). The deployment recommendation is then used to determine a deployment plan that is to be executed for instantiating the virtualized service. The automatic determination of the placement recommendation is part of an automatic process for creating the deployment plan. Automation of the creation of the deployment plan reduces the complexity of maintaining deployment plan designs for each possible deployments manually.

The solution presented herein enables an automatic virtualized service deployment mechanisms that considers a combination of definition and placement of each of the service functions that forms the virtualized service. In contrast to existing deployment mechanisms, the definition of each one of the services is performed in conjunction with the placement of the service function resulting in a dynamic and optimal deployment.

The operations in the flow diagrams will be described with reference to the exemplary embodiments of FIGS. 1A-G. However, it should be understood that the operations of the flow diagrams can be performed by embodiments of the invention other than those discussed with reference to FIGS. 1A-G, and the embodiments of the invention discussed with reference to these figures can perform operations different than those discussed with reference to the flow diagrams. While the example of FIGS. 1A-G show a virtualized service defined based on a particular set of service functions, this is intended to be exemplary only and should not be viewed as a limitation of the present embodiments. Several types and numbers of service functions can be chained to form a virtualized service and the operations of the flow diagram described herein can be used to determine a deployment plan for any combination of type and number of service functions.

Figure 2A:
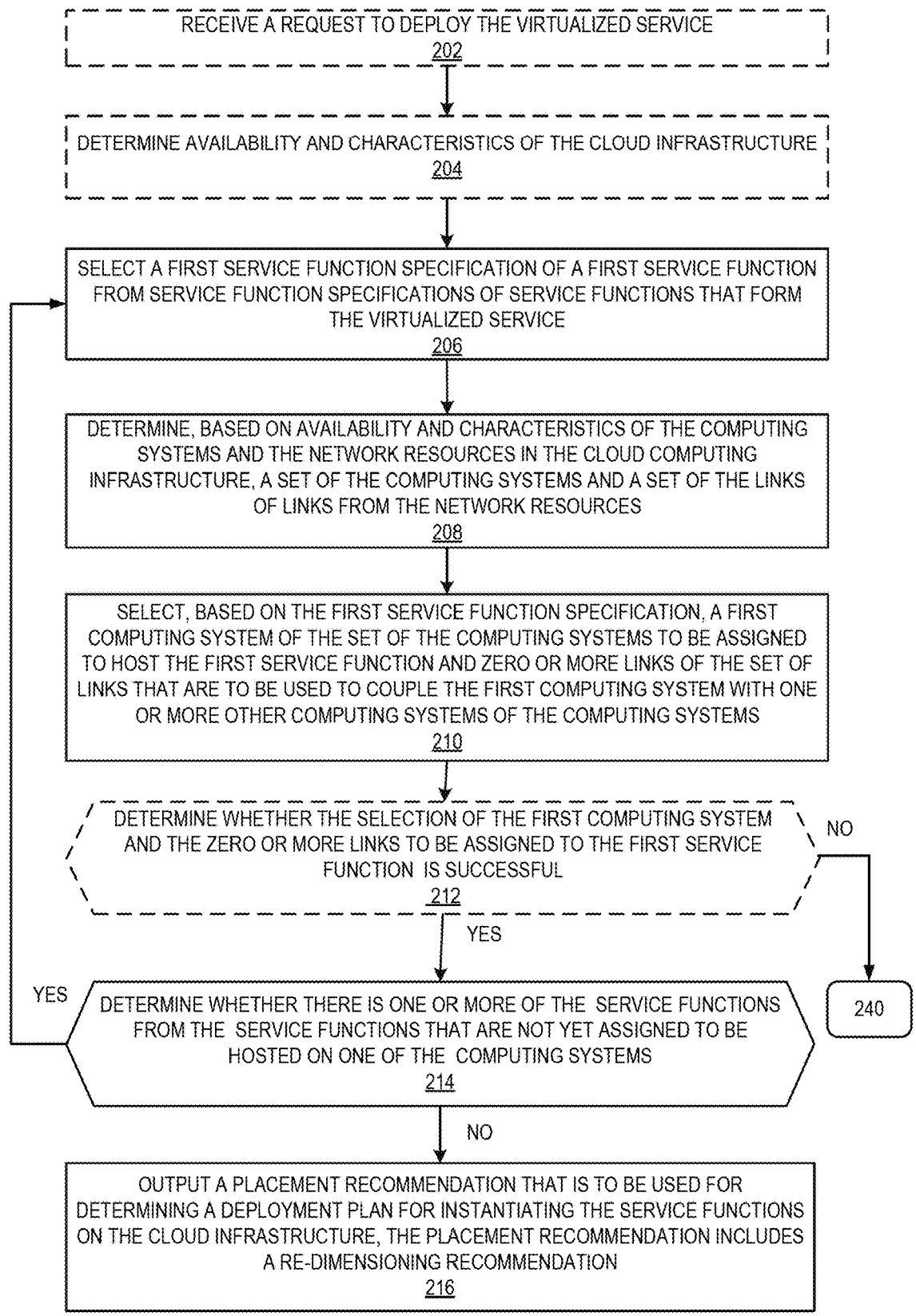
FIG. 2A illustrates a flow diagram of exemplary operations for automatic placement of service functions, in accordance with some embodiments.

FIG. 2A illustrates a flow diagram of exemplary operations for automatic placement of service functions, in accordance with some embodiments. In some embodiments, the operations of the flow diagram are performed by a service orchestrator 122.

At operation 202, the service orchestrator 122 receives a request to deploy a virtualized service. The request includes a service specification for the virtualized service. The service specification includes the service function specifications of the service functions that form the virtualized service. For example, the request may include the service specification 128 illustrated in FIGS. 2A and 1D. In some embodiments, the service specification 128 is an example of service specification 108 that can be determined based on a service context and a service template as described with reference to FIGS. 1B-D. One of ordinary skill in the art would understand that the service specification 128 is intended to be exemplary only.

The flow of operations moves to block 204. At block 204, the availability and characteristics of the cloud infrastructure are determined. The availability and characteristics of the cloud infrastructure include one or more attributes that identify the resources that can host an instance of a service function and their corresponding availability and characteristics. For example, the attributes can include an identification of the computing or networking resources (e.g., a data center, virtual or physical network connection between data centers), an indication of the geographical location of the resources, and one or more additional attributes that relate to the capabilities of the resource such as (memory capacity, compute power, latency capability, bandwidth, etc.). The attributes may include an indication of whether the resource is available or already allocated (e.g., resource already allocated to other service functions of the virtualized service to be deployed, resource already allocated to other services, or both). The attributes may include a list of software and hardware packages that are available at a given location. For example, the attributes may include an indication of whether a computing system supports hardware acceleration or not. In some embodiments, the attributes may indicate the type of the computing system (e.g., edge data center, data center, server, etc.). In some embodiments, the attributes may include an identification of service function types and/or corresponding versions that are pre-loaded onto or supported by the compute resource.

In some embodiments, one or more of the attributes for a resource can be associated with a cost of selecting the resource. The cost can be a monetary cost that is to be applied for the usage of the service with a corresponding attribute. Additionally or alternatively, the cost can be assigned to the resource in the interest of enabling selection of the resource as it will be described in further detail below. In some embodiments, the cost can be a reward for selecting the resource.

In some embodiments, the availability and characteristic of the cloud infrastructure may be obtained by the service orchestrator 122 from a central inventory component that gathers the information from the multiple elements of the cloud infrastructure (compute and network infrastructure). Additionally or alternatively, the service orchestrator 122 may obtain the information from sub-orchestration systems that are associated with sub-systems of the cloud infrastructure. A sub-orchestration system may be associated with a single one of the computing systems 130A-N or with two or more of the computing systems 130A-N. Similarly a sub-orchestration system can be operative to determine and transmit to the service orchestrator 122 the availability and characteristics of the network infrastructure. The availability and capabilities of the cloud infrastructure may be obtained synchronously or asynchronously. In some embodiments, the availability and capabilities of the cloud infrastructure can be regularly updated and made available to the service orchestrator 122. In these embodiments, if neither cached information nor up-to-date inventory of the availability and capabilities is available, the service orchestrator 120 may pull the information from a central inventory and/or one or more sub-orchestrators. In other embodiments, the availability and capabilities of the cloud infrastructure can be pulled by the service orchestrator 122 as needed upon receipt of a request for a new service without the receipt of regular updates.

Referring to the example of FIG. 2A, the determination, at operation 204, of the availability and characteristics of the cloud infrastructure results in the set of computing systems 130A, 103B, 103C, 103D, and 130N with respective availability and characteristics Av.&Ch. 123A-N. The determination further results in obtaining the availability and characteristics of the network resources (e.g., link(s) 126A-D). In some embodiments, two or more links may couple two or more computing systems and the determination of the availability and characteristics results in listing all of these links. Alternatively or additionally, a single link may couple two computing systems and the determination of the availability and characteristics result in the single link In some embodiments, each available resource (networking (e.g., link) and/or computing resource (e.g., processing and storage)) may be associated with a cost.

Referring to FIG. 2A, the flow of operations then moves to block 206. At operation 206 a first service function from the service functions is selected. The first service function is defined based on its associated first service function specification, which includes a first set of attributes. In some embodiments, the first service function can be an initial function from the multiple service functions that form the virtualized service and no other service function has been assigned to a host in the cloud infrastructure. Alternatively, the first service function can be a subsequent service function that follows one or more service functions that have previously been assigned to one or more hosts in the cloud infrastructure. In some embodiments, the selection of the first service function further includes selecting on or more link(s) for the first service function. The link(s) couple the first service function to one or more of the other service functions. In some embodiments, the link(s) may couple the service function to one or more service functions that have been previously assigned to hosts in the cloud infrastructure. In other embodiments, the link(s) may be available link(s) that originates from the first service function and can be used to couple the service function to one or more service functions and their potential hosts that have not yet been assigned.

Figure 2B:
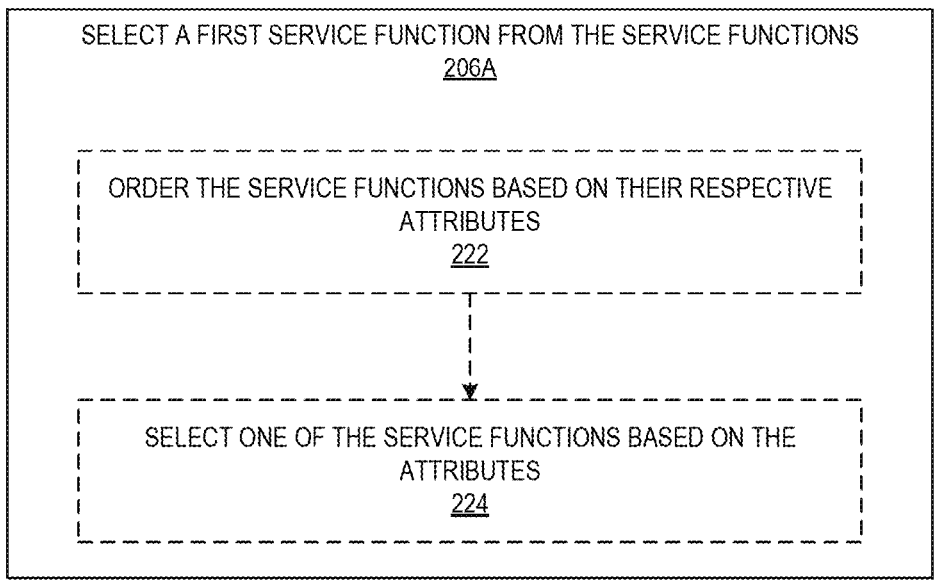
FIG. 2B illustrates a flow diagram of exemplary operations that can be performed for selecting the first service function, in accordance with some embodiments.

The selection of the first service function can be performed through different mechanisms. In some embodiments, the selection of the service function can be entirely or partially determined according to the chaining of the service functions. Alternatively or additionally, the selection of the service function can be performed as described with respect to FIG. 2B. FIG. 2B illustrates a flow diagram of exemplary operations that can be performed for selecting 206A the first service function, in accordance with some embodiments. At operation 222 the service functions forming the virtualized service (e.g., 152A-152G) are ordered based on one or several of attributes of the service functions. For example, different optimization heuristics can be used to order the service functions based on their attributes. The service function can be ordered based on the attributes that indicate the service functions requirements and constraints. For example, the service functions can be ordered based on the length of the link/cycle they belong to in the chain of service functions; service functions can be ordered based on the cloud resources needed (service functions requiring more computing/memory/networking resources can be ordered such that they are selected in priority with respect to service function requiring less resources, service function requiring less computing/memory/networking capabilities can be selected in priority of other service functions, etc.), etc. At operation 224, a first service function is selected based on the order determined according to the attribute.

Figure 2C:
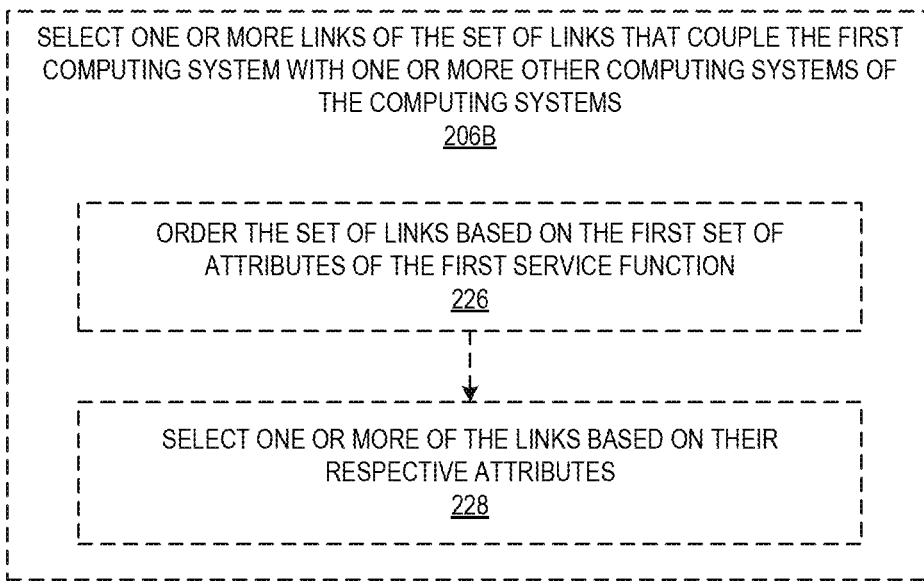
FIG. 2C illustrates a flow diagram of exemplary operations that can be performed for selecting the one or more links for the first service function, in accordance with some embodiments.

FIG. 2C illustrates a flow diagram of exemplary operations that can be performed for selecting 206B the one or more links for the first service function, in accordance with some embodiments. At operation 226 the available links associated with the selected first service function are ordered based on one or several of attributes of the links. At operation 228, one or more links are selected from the links based on the attributes of the links. For example, links with more stringent constraints can be prioritized (e.g., links with higher bandwidth requirement, lower latency requirement, etc.). Alternatively, links with less constraints can be prioritized.

Figure 1E:
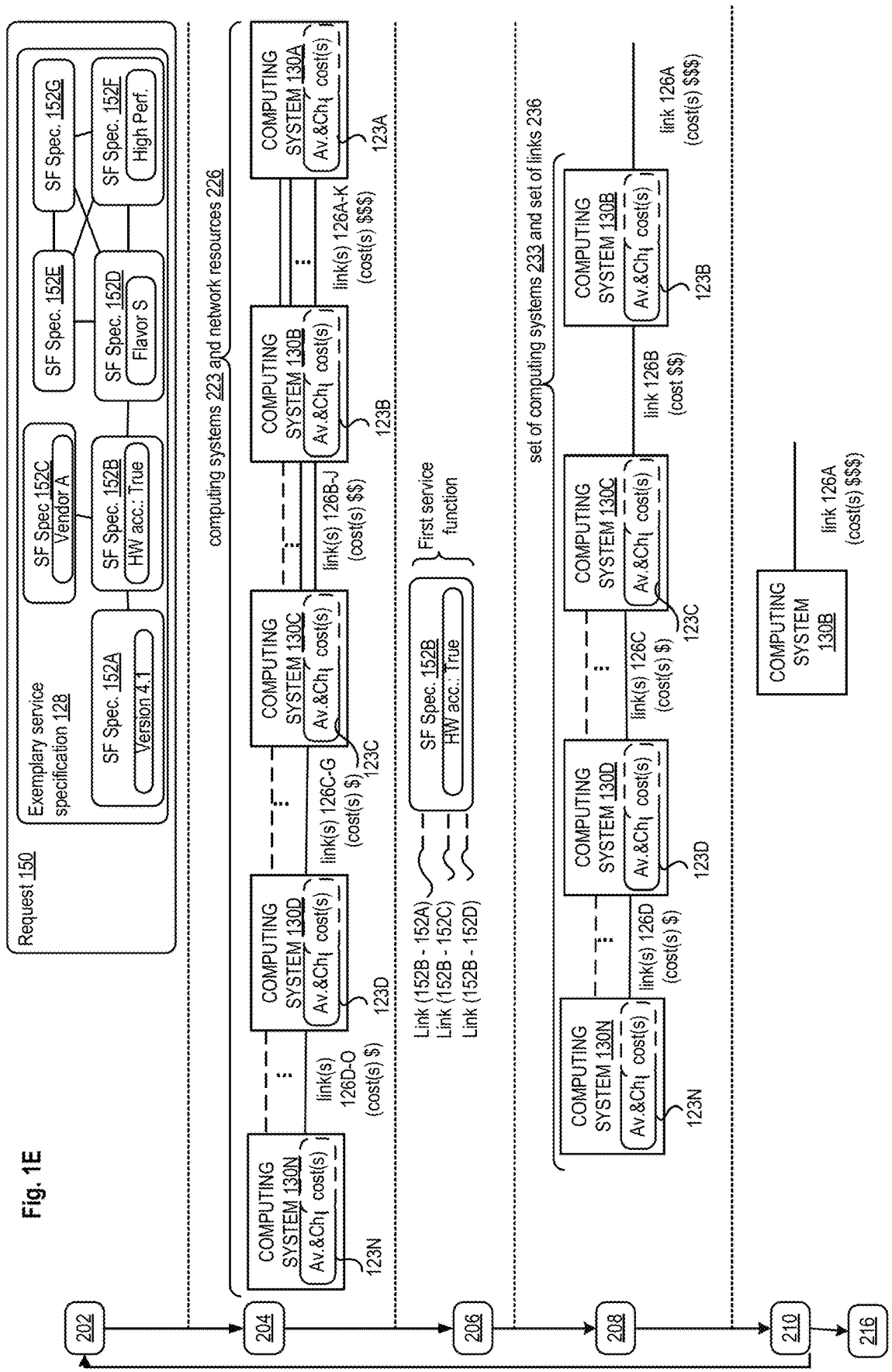
FIG. 1E illustrates a block diagram of an exemplary request that is to be processed for placement of a virtualized service onto a cloud infrastructure, in accordance with some embodiments.

FIG. 1E illustrates a block diagram of an exemplary request that is to be processed for placement of a virtualized service onto a cloud infrastructure, in accordance with some embodiments. In FIG. 1E, SF 152B is selected as the first service function. In this example, SF Spec. 152B is selected to be assigned to a host in the cloud infrastructure following the assignment of SF Spec. 152A to a host. In this example, SF Spec. 152B is not an initial service function to be placed on a host but instead a subsequent service function that is selected following the placement of SF Spec. 152A. In some embodiments, the selection of the service function 152B further includes the selection of the links that couple the service function with one or more other service functions. For example, the links may include the link 152B-152A, the link 152B-152C, and the link 152B-152D. In some embodiments, only a subset of these links may be selected, for example, the link 152B-152A may be selected as a result of the service function 152A being already assigned to a host and the links 152B-152C and 152B-152D may not be selected as service functions 152C and 152D may not have been placed yet.

Referring back to FIG. 2A, the flow operations then moves to operation 208, at which a set of the computing systems and a set of links are determined based on availability and characteristics of the computing systems and the links in the cloud infrastructure. The set of the computing systems are selected based on attributes of the computing systems such as geographic location, policies, ownership of the computing systems, as well availability of the computing systems. Referring to FIG. 1E, a set 223 which includes computing system 130B, computing system 130C, computing system 130D, and computing system 130N of the computing systems 130A-N is determined based on the availabilities and characteristics obtained at operation 204. For example, the characteristics and availability determined at operation 204 may indicate that the computing system 130A does not have capacity to support an additional service function as it is already selected to host the service function SF Spec. 152A. Other criteria can be used to determine the set of computing systems is selected. For example, the availability and characteristics of the computing systems 130A-N indicate the geographic location of each one of the computing systems and the selection of the set of computing systems 223 is performed based on their respective locations and the geographic location of the first service function. Additionally or alternatively, the selection of the set of computing systems 223 can be performed based on one or more attributes of the first service function and availability and characteristics of the computing systems.

The flow of operations then moves to operation 210, at which a first computing system of the set of computing systems is assigned to host the first service function and zero or more links that are to be used to couple the first computing system with one or more other ones of the computing systems based on the first service function specification. In some embodiments, the selected computing system can be a computing system that has previously assigned to host another service function. Alternatively, the selected computing system can be a computing system that has not been previously selected. In some embodiments, two or more links can be selected from the set of links to be used to couple the computing system to two or more other computing systems that host other service function. Alternatively, no link can be selected as the connection with other service function may have previously been determined by the selection of the links at preceding operations when other service functions were assigned to computing systems. In some embodiments, a single link is selected from the set of links In the example of FIG. 2A, the computing system 130B is selected to host the first service function 152B and a link 126A is selected to couple the first service function when instantiated on the computing system 130B to service function 152A when hosted on computing system 130A. In some embodiments, the link 126A is one of multiple links 126A-K that connect the computing system 130B and the computing system 130A. Each of the links 126A-K may be associated with the same or a different cost.

Figure 2D:
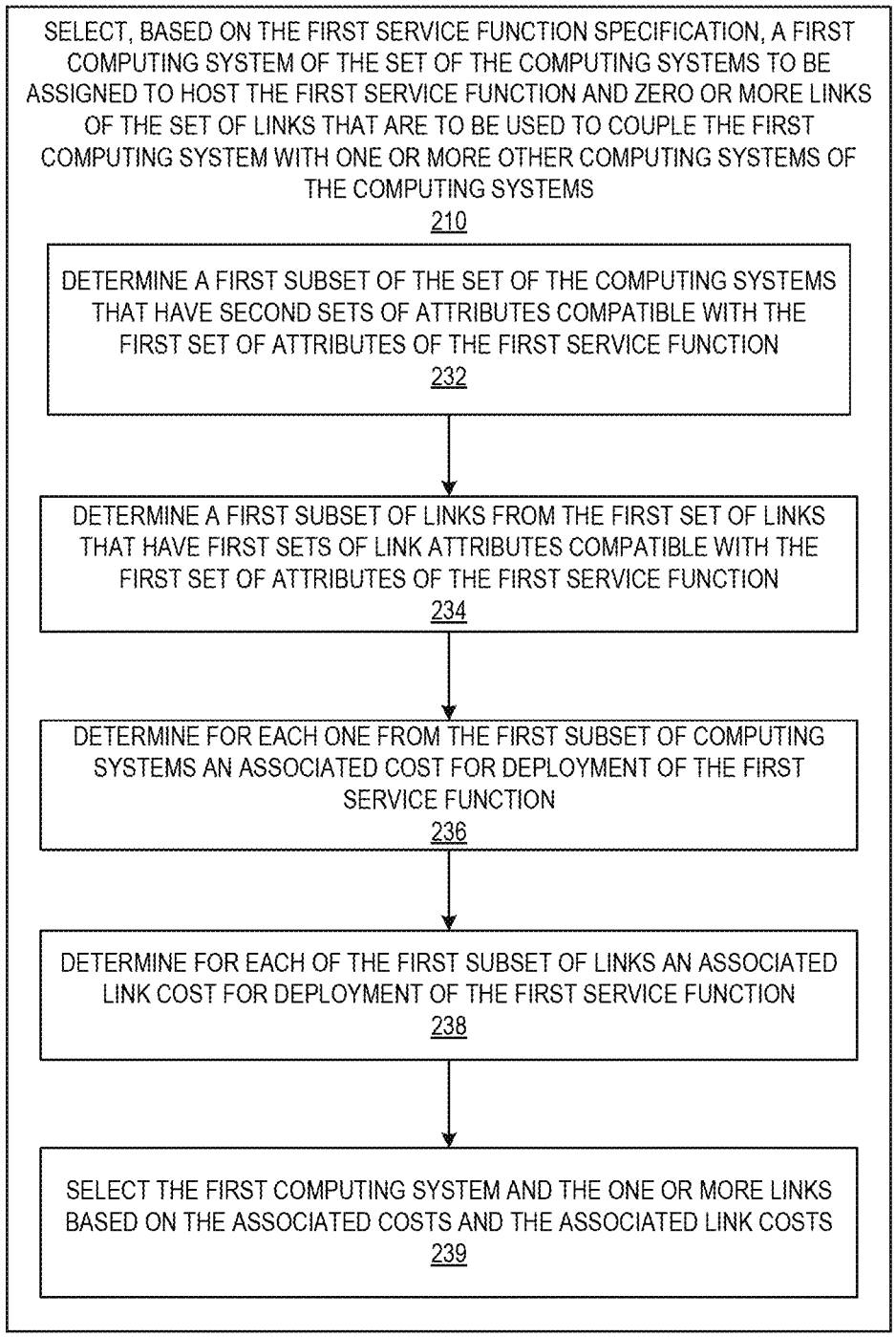
FIG. 2D illustrates a flow diagram of exemplary operations that can be performed for selecting the first computing system of the set of the computing systems to be assigned to host the first service function, in accordance with some embodiments.

In some embodiments, selecting the first computing system of the set of the computing systems to be assigned to host the first service function and zero or more links of the set of links that couple the first computing system with one or more other computing systems of the computing systems can be performed according to the operations described with respect to FIG. 2D.

In some embodiments, the flow may further include operation 212, at which a determination of whether the selection of the first computing system and the zero or more links to be assigned to the first service function is successful is performed. In some embodiments, determining that the selection is successful includes a determination that the selected first computing system and/or the zero or more links have attributes that are compatible with the attributes of the first service function. In other words, for the selection to be successful, the first computing system and the zero and more links need to be capable of supporting deployment of the first service function. In some embodiments, the selection may not be successful, in that case the flow of operations moves to operation 240. Upon determining that the selection is successful, the flow of operations moves to operation 214.

At operations 214, a determination of whether one or more of the service functions from the service functions are not yet assigned to be hosted on one of the computing systems is performed. In response to determining that there is one or more of the service functions that are not yet assigned to be hosted on one of the computing systems, the flow of operations moves to operation 206 and operations 206-214 are repeated until it is determined that all of the service functions that form the virtualized service are assigned to computing systems with links that couple the service functions. For example, upon assignment of the first service function 152B to the computing system 130B with the link 126A, the next service function is selected to be placed on the cloud infrastructure. The next service function is one of the remaining non-assigned service functions 152C-G. For example, the next service 152C can be selected.

Figure 1F:
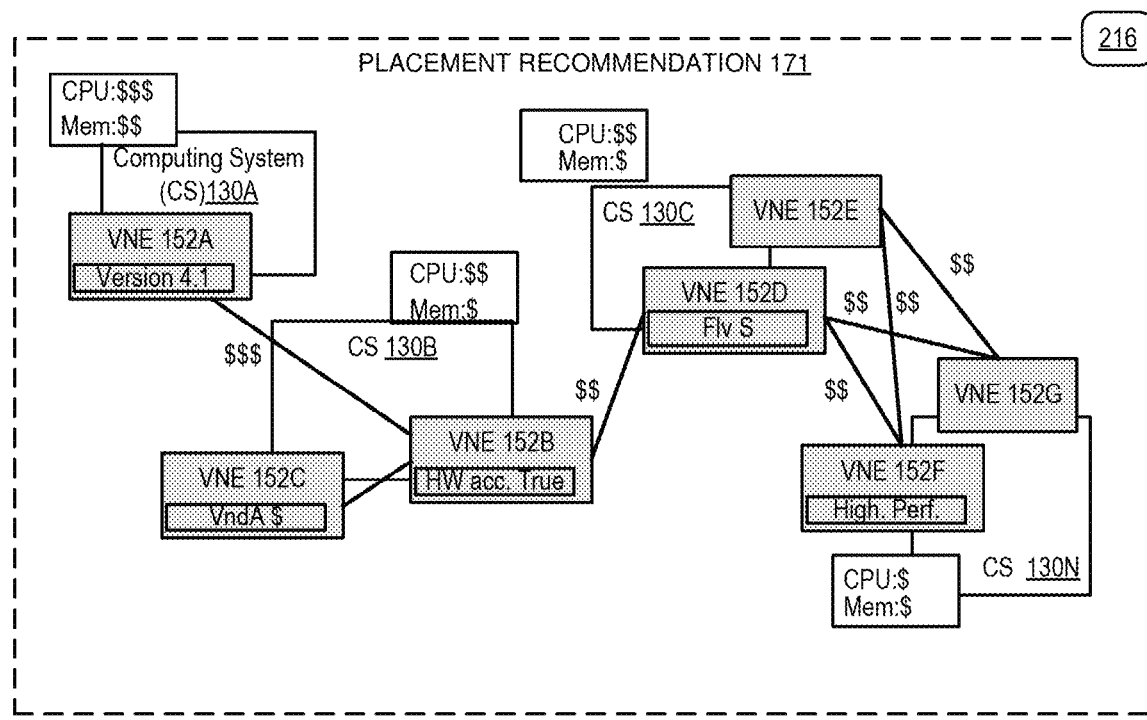
FIG. 1F illustrates an exemplary placement recommendation for the service function, in accordance with some embodiments.

Alternatively, responsive to determining that all of the service functions are assigned to a second set of computing systems in the cloud infrastructure, a placement recommendation is output. The placement recommendation is to be used for determining a deployment plan 171 for instantiating the service functions on the cloud infrastructure. The placement recommendation indicates for each one of the service functions a corresponding one of the second set of computing systems and a second set of links from the one or more links that couple the second set of computing systems. FIG. 1F illustrates an exemplary placement recommendation for the service function, in accordance with some embodiments. The placement recommendation 170 includes an indication of the assignment of each one of the service functions 152A-G onto one or more computing systems 130A-N of the cloud infrastructure. In the illustrated example, service function 152A is assigned to be hosted on computing system 130A, service function 152B is assigned to be hosted on computing system 130B, service function 152C is assigned to be hosted on computing system 130B, service function 152D and service function 152E are assigned to be hosted on computing system 130C, and service functions 152F and 152G are assigned to be hosted on computing system 130N. The assignment is performed based on the availability and characteristics of the computing systems 130A, 130B, 130C, and 130N as well as based on the attributes of the service function specifications of each one of the service functions 152A-G. The placement recommendation can then be used to determine a deployment plan 171. The deployment plan 171 is then used by one or more cloud infrastructure managers to instantiate the virtualized service on the cloud infrastructure. The instantiation of the virtualized service may include transmitting detailed steps to each one of the infrastructure managers for instantiating the service functions as defined by their respective service function specifications. In some embodiments, the computing system may already have a version of the service function that is on-boarded (registered) prior to their use and can create a new instance for the current service that is to be deployed. Having versions already on-boarded on the computing system reduces fulfillment times (e.g., fetching images or layers). Additionally or alternatively, the computing system may not include an image of the service function already loaded and an image of the service function is transmitted with a request to be instantiated on the computing system. In addition to indicating the placement of the service functions onto computing systems, the placement recommendation 170 further indicates one or more links that are to be used to couple the service functions through the network resources of the cloud infrastructure. The links can be virtual or physical network connections.

Figure 1G:
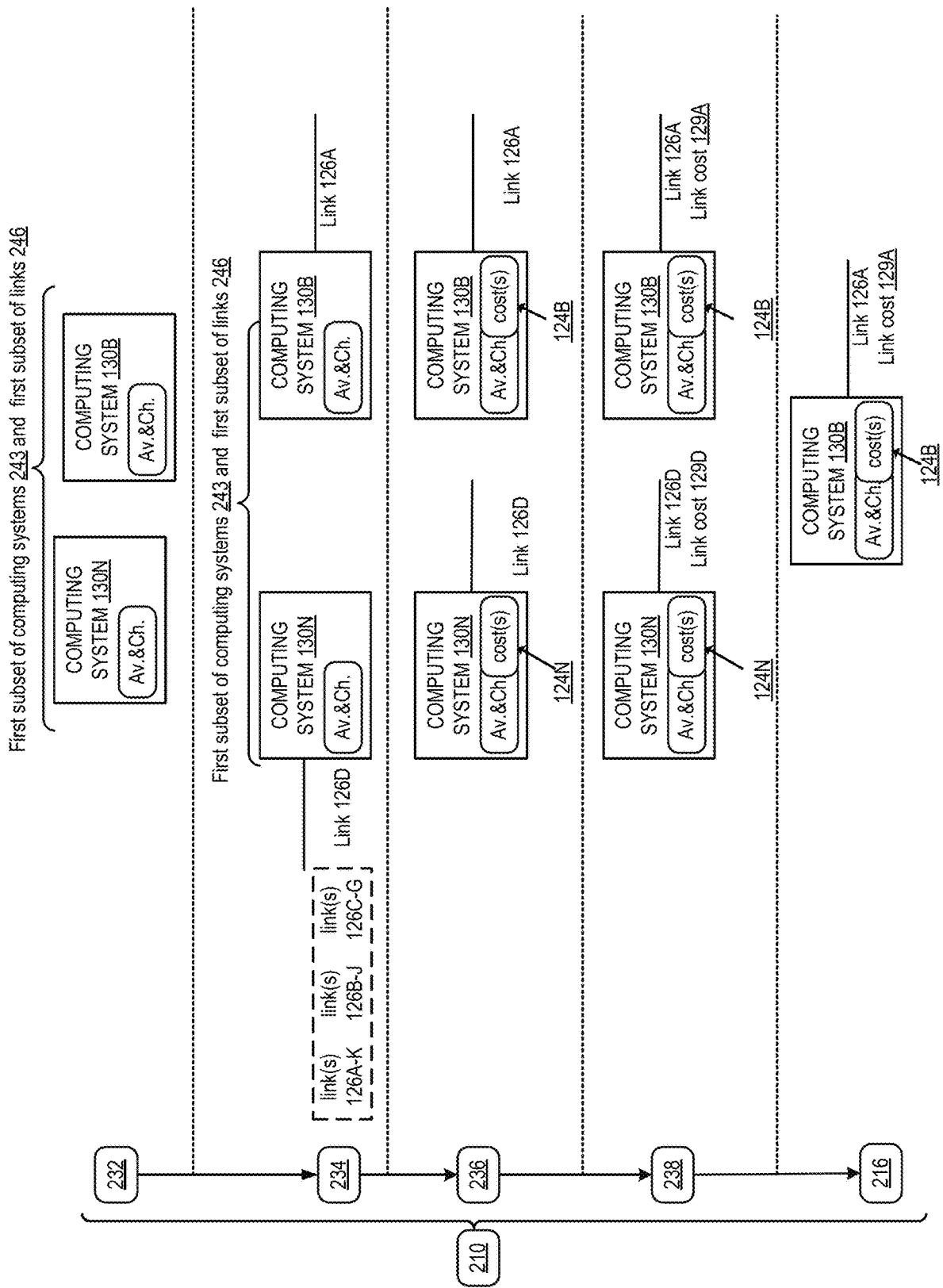
FIG. 1G illustrates a block diagram of exemplary cloud resources selected for a first service function, in accordance with some embodiments.

FIG. 2D illustrates a flow diagram of exemplary operations that can be performed for selecting the first computing system of the set of the computing systems to be assigned to host the first service function, in accordance with some embodiments. The operations of FIG. 2D will be described with reference to FIG. 1G. At operation 232, a first subset of computing systems is determined from the first set of the computing systems that have a second set of attributes compatible with the first set of attributes of the first service function. In some embodiments, the second set of attributes of the first subset of computing systems is compatible with the attributes of the first service function when the computing requirements of deployment of the first service function are satisfied by the hardware and/or software resources of the computing systems. For example, the characteristics of the computing system may indicate that one or more versions of the service function are pre-loaded/registered with the computing system (e.g., 142A version 4.1 and version 3.3. are registered with the computing system 130A). Alternatively or additionally, the characteristics of the computing system may indicate whether or not some hardware implementations can be supported by the computing system (e.g., hardware acceleration, high performance, graphics processing unit (GPU) implementation, etc.). The flow then moves to operation 234, at which a first subset of a first set of links is determined. The first subset of links has a first set of link attributes compatible with the first set of attributes of the first service function is determined. In some embodiments, the link attributes of the subset of links is compatible with the attributes of the first service function when the networking requirements of deployment of the first service function are satisfied by the subset of the links. For example, the subset of links may satisfy bandwidth, latency and/or geographical location required for the service function. Additionally or alternatively, the subset of links may satisfy network, communication, and security protocols requirements of the first service function. With reference to FIG. 1G, the subset of computing systems includes system 130N and system 130B. Each of the systems is able to host the service function as defined with service function specification 152B as each of the two computing systems includes an indication that SF 142B with Hardware acceleration is supported. The first subset of links may include the link 126A for the computing system 130B. The first subset of links may include the links 126D for the computing system 130B. In some embodiments, the first subset of links may further include one or more of the links 126C-G, 126B-J, and 126A-K.

At operation 236, for each one of the first subset of computing systems an associated cost for deployment of the first service function is determined. For example, for each one of the subset of computing systems 130B and 130N an associated cost is determined. The cost can be a reward associated with the placement of the service function at a computing system. Alternatively and additionally, the cost can be a fee to be paid by a customer and/or service provider for the placement of the service function at the computing system. Cost 124N corresponds to the cost of assigning or placing the service function specification 152B onto the computing system 130N is cost 124B corresponds to the cost of assigning or placing the service function specification 152B onto the computing system 130B.

The flow then moves to operation 238 at which for each of the first subset of links an associated link cost is determined. The link cost is associated with the deployment of the first service function. Cost 129A is associated with the selection of link 126A and cost 129D is associated with the selection of link 126D. The flow then moves to operation 239, at which the first computing system and the zero or more links are selected based on the associated costs and the associated link costs. The subset of computing system 243 and the subset of links 246 are ranked based on the costs (124B, 124N, 129A, 129D). Different ranking mechanisms can be used without departing from the scope of the present embodiments. For example, the computing systems and links can be ranked based on a cost of using the resources in a decreasing order. Alternatively or additionally, the computing systems and links can be ranked based on a reward that is allocated to the customer and/or service provider for using the resources. Based on this ranking the computing system 130B and the link 126B are selected for the placement of the first service function 152B. The computing system 130B is compatible with the attribute of the first service function 152B and is operative to host this service function. For example, the computing system 130B is operative to support a version of service function 142B with hardware acceleration as well as a version of 142B with CPU implementation only. Each of these version being associated with a respective cost. This is compatible with the attributes of the first service function specification 152B which indicate the need for hardware acceleration instantiation.

Figure 2E:
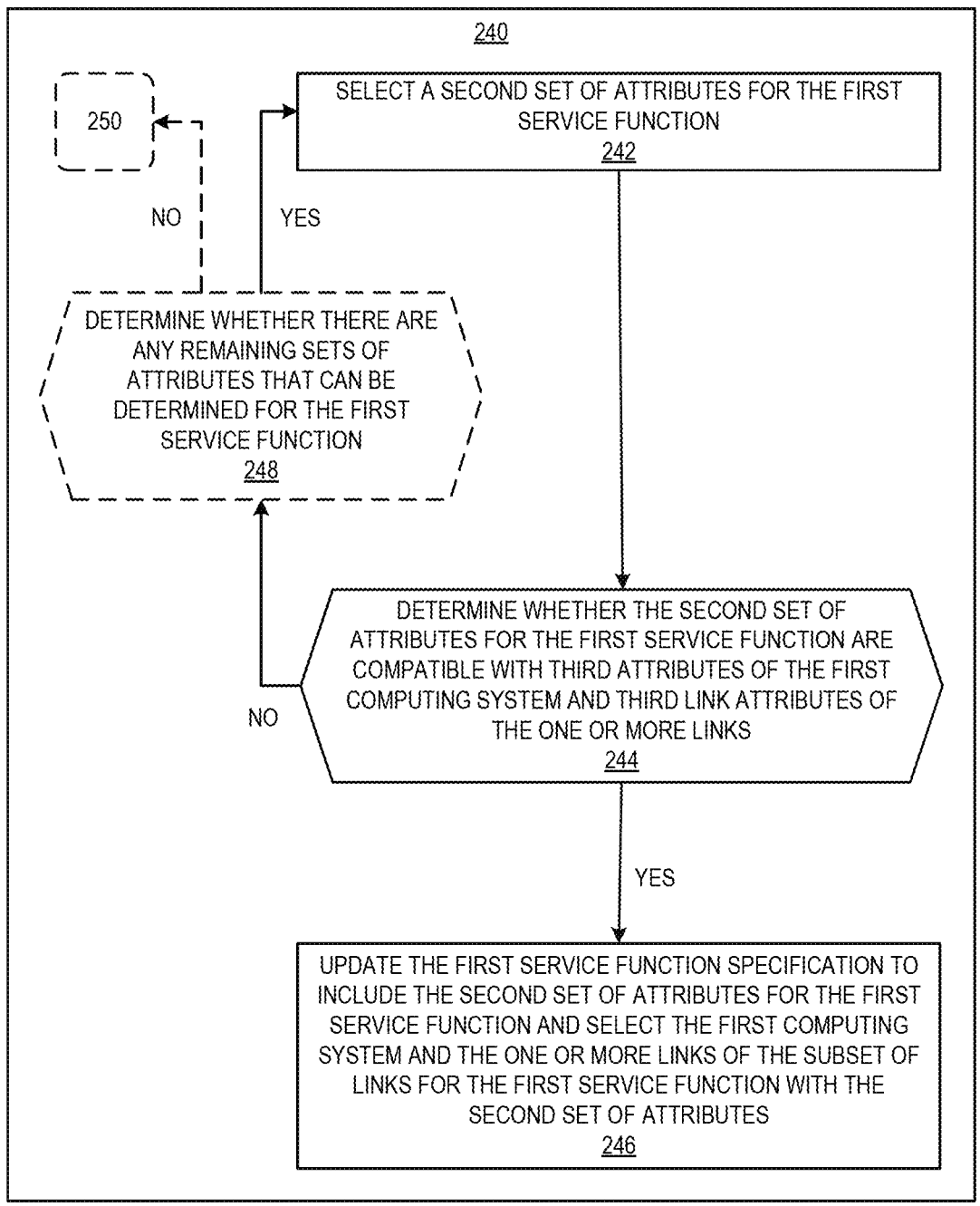
FIG. 2E illustrates a flow diagram of exemplary operations that can be performed upon determination that the placement of a service function onto a computing system is not successful, in accordance with some embodiments.

FIG. 2E illustrates a flow diagram of exemplary operations that can be performed upon determination that the placement of a service function onto a computing system is not successful, in accordance with some embodiments. In some embodiments the selection of a first computing system and/or links for a service function at operation 210 may not be successful, i.e., no computing system may be available and/or compatible with the attributes of the service function that is selected. In response to determining that the selection of a computing system and/or links for the service function is not successful, the operations of block 240 can be performed. In some embodiments, the operations of block 240 can be performed as a result of determining, at block 212 of FIG. 2A, that the selection of the computing system and the links is not successful.

At operation 242, a second set of attributes is selected for the first service function. The second set of attributes includes at least one attribute for the service function that is different from the first set of attributes determined for the first service function. For example, a first set of attributes for the first service function may determine a first software version for the service function, a vendor of the software version of the service function, hardware requirements (e.g., hardware acceleration), networking requirements such as a first bandwidth, a first latency, a geographic location for the first service function, and one or more additional attributes that define the first service function. When the second set of attributes are determined at least one of the listed first attributes can be different from the corresponding attribute in the first attributes. For example, a different geographic location for the first service function, a different software version, different hardware implementation requirements, different networking requirements, can be selected as the second attributes for the first service function. These attributes satisfy the requirements and constraints set by the customer and/or the service provider for the virtualized service (e.g., these attributes are compatible with the input parameter 106 and the service policies 107).

The flow then moves to operation 244, at which a determination of whether the second set of attributes for the first service function are compatible with third attributes of the first computing system and third link attributes of the one or more links is performed. In some embodiments, the third set of attributes of the first computing system is compatible with the attributes of the first service function when the computing requirements of deployment of the first service function as defined based on the second attributes are satisfied by the hardware and/or software resources of the first computing system.

Responsive to determining that the second set of attributes for the first service function are compatible with the third attributes of the first computing system and the third link attributes of the one or more links, the flow moves to operation 246. At operation 246, the first service function specification is updated to include the second set of attributes for the first service function and the first computing system and the one or more links of the subset of links are selected for the first service function with the second set of attributes. In this embodiment instead of cancelling the placement of the first service function onto the first computing system, a new set of attributes may be determined for the first service function without changing the placement of the service function in the cloud infrastructure. This presents a dynamic placement and definition of service functions which in addition to taking into account characteristics and availability of the cloud infrastructure resources allows for a modification of attributes of a service function when a resource is selected for placement.

Responsive to determining that the second set of attributes for the first service function are not compatible with the third attributes of the first computing system and the third link attributes of the one or more links, the flow moves to operation 242 or alternatively to operation 248. Operation 248 is optional, and the flow of operations moves to operation 242 in some embodiments. In other embodiments, the flow of operations moves to operation 248 and then to operations 242 or 250. At operation 248, a determination of whether there are any remaining sets of attributes that can be determined for the first service function is performed. In some embodiments, the first service function may have strict constraints and requirements that cause a single set of attributes to be available for the deployment of the service function. In these embodiments, the placement of the service function needs to be performed according to the first set of attributes that was previously determined for the service function. In these embodiments, once the placement of the first service function with the first attributes is determined to be unsuccessful on the selected first computing system there are no other options for the attributes of the service function and the flow of operation moves to operation 250. In other embodiments, while the service function may have two or more sets of attributes that may be used for the placement of the service functions, these sets of attributes may have been already explored in relation with a placement of the first service function at the first computing system and resulted in unsuccessful placement and no remaining set of attributes is available. In this case, the flow of operations also moves to operation 250.

Alternatively, upon determining that there is still at least a set of attributes that can be selected for the first service function at operation 248, the flow of operations moves to operation 242 and the second set of attributes is selected for the first service function. The flow of operations is repeated until compatibility between attributes of the first service function and the attributes of the first computing system is determined or no compatibility can be found for any of the possible sets of attributes of the service function and the attributes of the first computing system.

Figure 2F:
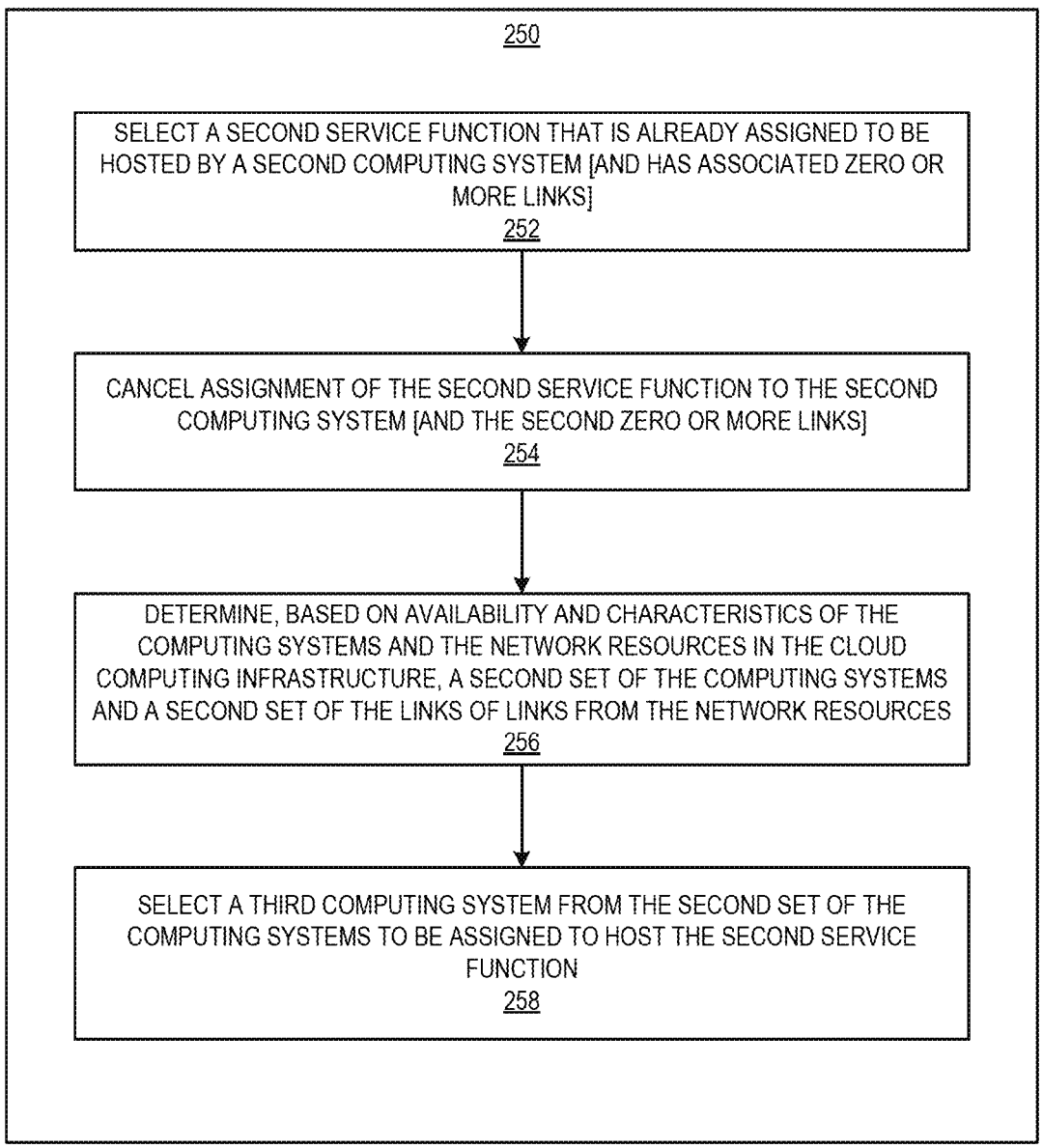
FIG. 2F illustrates a flow diagram of exemplary operations performed for backtracking a placement of a previous service function when the placement of the service function is not successful, in accordance with some embodiments.

FIG. 2F illustrates a flow diagram of exemplary operations performed for backtracking a placement of a previous service function when the placement of the service function is not successful, in accordance with some embodiments. In some embodiments, the operations 250 can be performed upon determination that there are no remaining sets of attributes that can be determined for the first service function 248 for a selected computing system. In some embodiments, the operations 250 can be performed upon determination that the selection of the selection of the first computing system to host the first service function is not successful without performing the operations 240.

At operation 252, a second service function that is already assigned to a second computing system is selected. The second service function can be any of the previously service functions placed to a computing system of the cloud infrastructure before the first service function. The second service function can be selected based on different mechanisms. For example, the second service function can be the service function that was placed immediately before the first service function. Alternatively, the second service function can be another service function that was placed before the first service function (different from the service function placed immediately before the first service function)) and which is selected based on a set of selection criteria (such as service function with more constraints, with higher network and/or computing resources needed, etc.). In some embodiments, the selection of the second service function that is already assigned further includes the selection of the associated links for this service function when the placement of the service function was accompanied with the selection of links from the network resources.

The flow of operations moves to operation 254 at which the assignment of the second service function to the second computing system is cancelled. In some embodiments, when the second service function was also associated with a set of associated links, the selection of these links is also canceled.

The flow then moves to operation 256, at which a second set of the computing systems and potentially a second set of the links from the network resources are selected based on updated availability and characteristics of the computing systems and the network resources in the cloud infrastructure. The selection of the second set of computing systems can be performed based on updated availability and characteristics of the computing systems and the network resources which reflect a current state of the cloud infrastructure.

The flow then moves to operation 258, at which a third computing system from the second subset of the computing systems is selected to be assigned to host the second service function. In some embodiments, a third link from the second subset of the links is also selected. The selection is performed based on the updated availability and characteristics as well as based on the attributes of the second service function. In some embodiments, the operations 250 can be repeated for one or more additional service functions that were previously assigned if the placement of the second service function is not successful. Operations 250 allow for the reversal of the placement of a second service function when it is determined that a next service function (the first service function) could not be placed on the cloud infrastructure consequently providing additional flexibility to the placement mechanisms described herein. These operations provide for a way to address incompatibility of a service function placement without requiring the need to revert all of the previously performed placements. Instead, the service function placement can be gradually reversed and reassigning one or multiple ones of the previously assigned service functions.

While some of the operations above were described with reference to a selection of a computing system for a first service function not being successful, in some embodiments, the failure of success of the placement of the service function can be due to a lack of compatibility of the networking resources instead of the computing resources. In these embodiments, the link attributes of the links selected for the service function are compared with the attributes of the service function that corresponds to the network resources needed for implementation of the service function. Thus, the operations described with respect to FIGS. 2E and/or 2F can be performed based on the link attributes of the selected links from the network resources of the cloud infrastructure.

The embodiments described herein provide for an automated and/or optimized placement and network service functions definition for deployment of a virtualized service. The embodiments provide a flexible, and run-time extensible set of service and hardware platform awareness attributes. The solution allows for a dynamic determination of a service function deployment plan which takes into consideration the characteristics and availability of the cloud resources as well as flexibility in the definition of the service functions to be deployed. In the proposed embodiments, the definition of the service functions to be deployed is performed in conjunction with the placement decision of the service function resulting in an automated and/or optimal placement and definition mechanisms of a virtualized service.

Virtualized service placement based on elasticity of the cloud infrastructure:

One of the advantages of a cloud-based infrastructure is its on-demand nature in capacity dimensioning. For example, the on-demand nature of the computing resources and scaling can be the business value of many cloud Infrastructure as a Service (IaaS) service products provided by cloud infrastructure providers (such as Amazon Web Service, Microsoft Azure, Google Compute Engine, etc.). The network resources also provide similar advantage (e.g., network slicing, VPNs, etc.).

Current deployment mechanisms of virtualized services do not consider the elastic nature of the cloud infrastructure resources (be it computing resources or networking resources). In these current deployment mechanisms, there is no coordination between a service management and orchestration component (e.g., service management and orchestration component 620) and the cloud infrastructure capacity design. Existing virtualized service deployment systems view the cloud infrastructure as a static pool of cloud resources. In these systems the deployment decisions of the service functions can be optimized only at the deployment time and do not benefit from the reconfigurable and scaling feature of the cloud infrastructure.

The embodiments described herein present a service orchestrator that is operative to determine a placement for a virtualized service that is adaptable to the elasticity of the underlying cloud resources. A method and system of deployment of a virtualized service on a cloud infrastructure while taking into consideration variability/elasticity of the cloud resources are described. Availability and characteristics of cloud resources (which may include computing systems and network resources) are received. The characteristics include varying characteristics which define potential variability in the resources of the cloud infrastructure. A first service function specification of a first service function is selected from service function specifications of service functions that form the virtualized service. A set of the computing systems and a set of links from the network resources that are candidates for hosting a first service function from service functions that form the virtualized service are determined. The determination of the candidates is performed based on the availability and characteristics of the computing systems and the network resources in the cloud infrastructure which includes the varying characteristics. A first subset of the set of computing systems that have second sets of attributes compatible with the first set of attributes of the first service function are determined. A first subset of links from a first set of links that have first sets of link attributes compatible with the first set of attributes of the first service function are determined. For each computing system of the first subset of the computing systems an associated cost for deployment of the first service function is determined. The associated cost includes one or more varying costs for usage of the computing system based on the varying characteristics. For each link of the first subset of links an associated link cost for deployment of the first service function is determined. The associated link cost includes one or more varying link costs for usage of the link based on the varying characteristics. A first computing system from the first subset of the computing systems and zero or more links based on the associated costs and the associated link cost are determined for placing the first service function in the cloud infrastructure. In some embodiments, the placement of all of the service functions is determined and a placement recommendation is output. The placement recommendation indicates for each one of the service functions a corresponding one of the second set of computing systems and a second set of links from the one or more links that couple the second set of computing systems.

The embodiments described herein enable the service orchestrator 122 to make placement recommendations that include re-dimensioning recommendations. The re-dimensioning recommendations are determined by a service orchestrator by considering the additional freedom of increasing or decreasing the allocated bandwidth capacity for links and/or increasing or decreasing the computational capacity of the computing systems. The placement recommendations with re-dimensioning recommendations result in lower overall service deployment costs as the initial deployment of the virtualized service takes into account future potential reconfigurations of the cloud infrastructure for modifying the capacity of the allocated resources. Thus, when compared with existing deployment solutions, in which a need of additional resources capacity causes a deployment of the service function at a different location (e.g., more remote, more costly) or simply causes the request for the additional resources to be blocked, the present embodiments allow for a deployment that is less likely to cause a re-deployment and instead can address a need of additional resources by a re-configuration of the allocated cloud resources. For the price of minor infrastructure reconfiguration steps (allocating more capacity). In addition, placement recommendations with re-dimensioning recommendations enables demand oriented and reactive infrastructure capacity design. The embodiments described herein remove the need for predetermined capacity planning of the infrastructure and increase cloud resource usage efficiency in distributed cloud scenarios. In addition, as the underlay network resources can be leased from infrastructure providers (e.g., an MVNO—Mobile Virtual Network Operator will not have any physical infrastructure but lease everything) this enables the lessee to consume only the needed resources while planning for future usage of the resources.

Referring back to FIG. 1A, the service orchestrator 122 further includes an infrastructure elasticity placement component (IEPC) 126. IEPC 126 can be used in combination to or separately from SFPC 119. IEPC 126 is operative to determine a placement recommendation 170 which includes a re-dimensioning recommendation 172. The re-dimensioning recommendation 172 includes placement recommendations for one or more cloud resource which takes into consideration potential capacity modifications of the cloud resources (e.g., capacity increase).

The operations in the flow diagrams will be described with reference to the exemplary embodiments of FIGS. 1A-D and/or 3A-B. However, it should be understood that the operations of the flow diagrams can be performed by embodiments of the invention other than those discussed with reference to FIGS. 1A-D and/or 3A-B, and the embodiments of the invention discussed with reference to these figures can perform operations different than those discussed with reference to the flow diagrams.

Figure 4A:
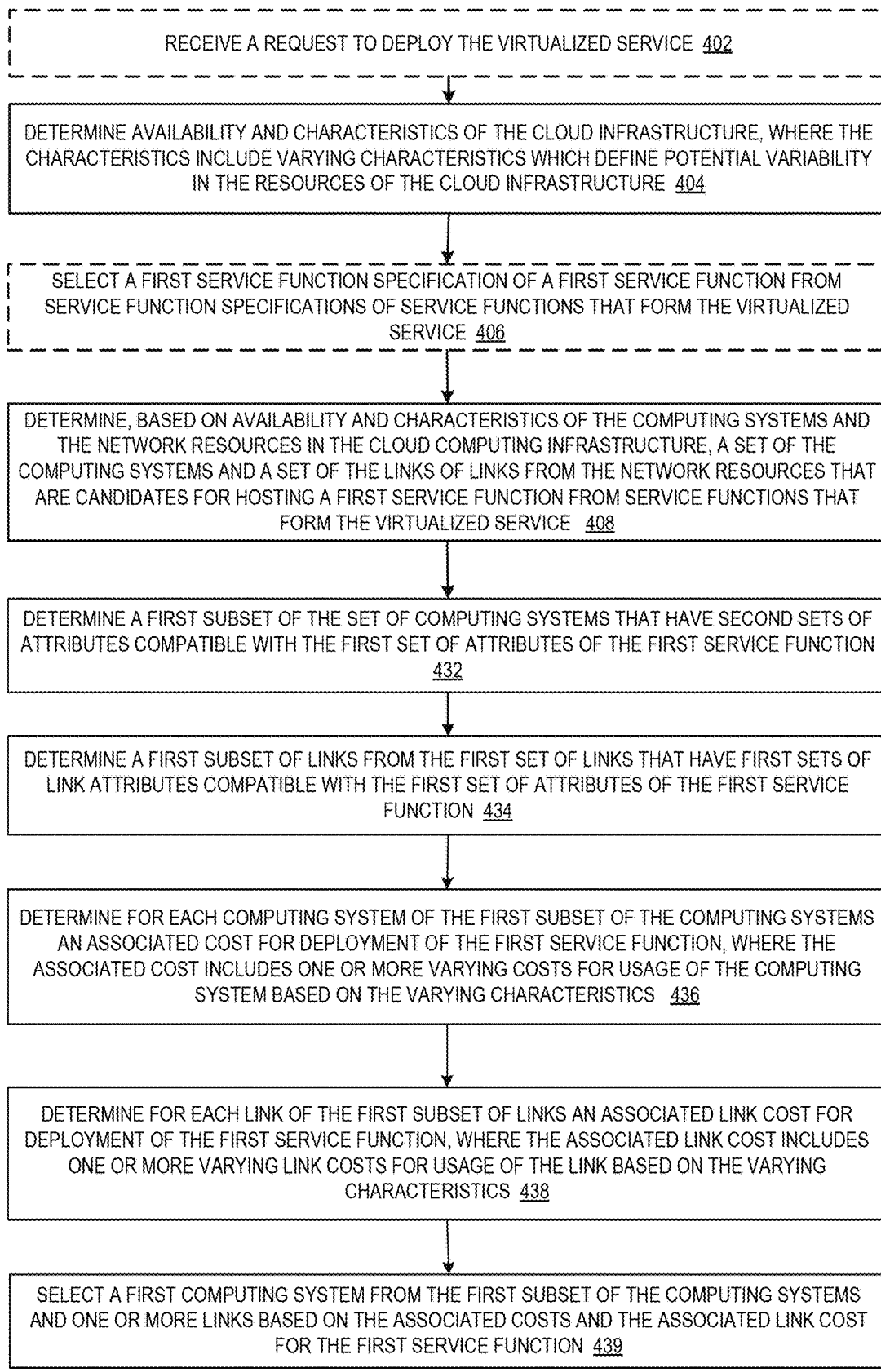
FIG. 4A illustrates a flow diagram of exemplary operations for automatic placement of a service function, in accordance with some embodiments.

FIG. 4A illustrates a flow diagram of exemplary operations for automatic placement of a service function, in accordance with some embodiments. In some embodiments, the operations of FIG. 4A can be performed by the service orchestrator 122 that includes an IEPC 121. In other embodiments, the operations of FIG. 4A can be performed by the service orchestrator 122 that includes IEPC 121 and SFPC 119. In these embodiments, the determination of a placement recommendation for a virtualized service can be performed by combining the operations of FIGS. 4A-B and the operations of FIGS. 2A-F.

At operation 402, the service orchestrator 122 receives a request to deploy a virtualized service. The request includes a service specification for the virtualized service. The service specification includes the service function specifications of the service functions that form the virtualized service. For example, the request may include the service specification 128 illustrated in FIGS. 2A, 3A and 1D.

The flow of operations moves to block 404. At block 404, the availability and characteristics of the cloud infrastructure are determined. The characteristics include varying characteristics which define potential variability in the resources of the cloud infrastructure. The availability and characteristics of the cloud infrastructure include one or more attributes that identify the resources that can host an instance of a service function and their corresponding availability and characteristics. For example, the attributes can include an identification of the computing or networking resources (e.g., a data center, virtual or physical network connection between data centers), an indication of the geographical location of the resources, and one or more additional attributes that relate to the capabilities of the resource such as (memory capacity, compute power, latency capability, bandwidth, etc.). The attributes may include an indication of whether the resource is available or already allocated (e.g., resource already allocated to other service functions of the virtualized service to be deployed, resource already allocated to other services, or both). The attributes may include a list of software and hardware packages that are available at a given location. For example, the attributes may include an indication of whether a computing system supports hardware acceleration or not. In some embodiments, the attributes may indicate the type of the computing system (e.g., edge data center, data center, server, etc.). In some embodiments, the attributes may include an identification of service function types and/or corresponding versions that are pre-loaded onto or supported by the compute resource. In some embodiments, some of the attributes discussed above may include a range of capacity and associated costs for each cloud resource. In some embodiments, one or more of the attributes for a resource can be associated with a cost of selecting the resource.

In some embodiments, the availability and characteristic of the cloud infrastructure may be obtained by the service orchestrator 122 from a central inventory component that gathers the information from the multiple elements of the cloud infrastructure (compute and network infrastructure). Additionally or alternatively, the service orchestrator 122 may obtain the information from sub-orchestration systems that are associated with sub-systems of the cloud infrastructure. A sub-orchestration system may be associated with a single one of the computing systems 130A-N or with two or more of the computing systems 130A-N. Similarly a sub-orchestration system can be operative to determine and transmit to the service orchestrator 122 the availability and characteristics of the network infrastructure. The availability and capabilities of the cloud infrastructure may be obtained synchronously or asynchronously. In some embodiments, the availability and capabilities of the cloud infrastructure can be regularly updated and made available to the service orchestrator 122. In these embodiments, if neither cached information nor up-to-date inventory of the availability and capabilities is available, the service orchestrator 120 may pull the information from a central inventory and/or one or more sub-orchestrators. In other embodiments, the availability and capabilities of the cloud infrastructure can be pulled by the service orchestrator 122 as needed upon receipt of a request for a new service without the receipt of regular updates.

Figure 3A:
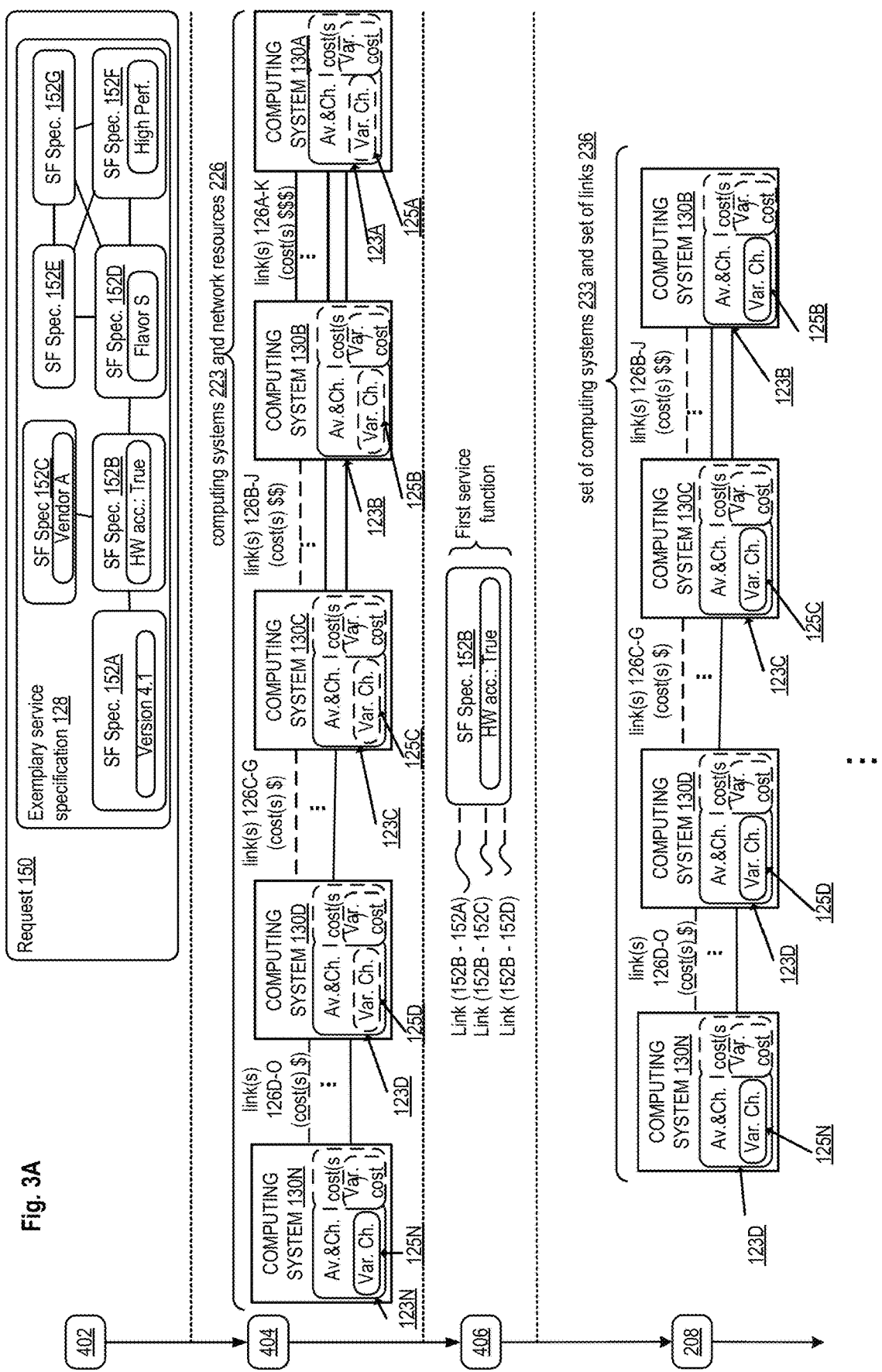
FIG. 3A illustrates a block diagram of an exemplary request that is to be processed for placement of a virtualized service onto a cloud infrastructure, in accordance with some embodiments.

Referring to the example of FIG. 3A, the determination, at operation 404, of the availability and characteristics of the cloud infrastructure results in the set of computing systems 130A, 103B, 103C, 103D, and 130N with respective availability and characteristics Av.&Ch. 123A-N. Each one of Av.&Ch. 123A-N may include a respective one of varying characteristics 125A-N. The determination, at operation 404, further results in obtaining the availability and characteristics of the network resources (e.g., link(s) 126A-D), which may also include varying characteristics (not illustrated in FIG. 3A). In some embodiments, two or more links may couple two computing systems and the determination of the availability and characteristics results in listing all of these links and their associated varying characteristics if applicable. Alternatively or additionally, a single link may couple two computing systems and the determination of the availability and characteristics result in the single link In some embodiments, each available resource (networking (e.g., link) and/or computing resource (e.g., processing and storage)) may be associated with a cost (cost).

Referring to FIG. 4A, the flow of operations then moves to block 406. At operation 406 a first service function from the service functions is selected. The first service function is defined based on its associated first service function specification, which includes a first set of attributes. In some embodiments, the first service function can be an initial function from the multiple service functions that form the virtualized service and no other service function has been assigned to a host in the cloud infrastructure. Alternatively, the first service function can be a subsequent service function that follows one or more service functions that have previously been assigned to one or more hosts in the cloud infrastructure. In some embodiments, the selection of the first service function further includes selecting on or more link(s) for the first service function. The link(s) couple the first service function to one or more of the other service functions. In some embodiments, the link(s) may couple the service function to one or more service functions that have been previously assigned to hosts in the cloud infrastructure. In other embodiments, the link(s) may be available link(s) that originates from the first service function and can be used to couple the service function to one or more potential hosts of other service functions that have not yet been assigned. The selection of the first service function can be performed through different mechanisms as described above with reference to FIG. 2A. Similarly, the selection of the links for the first service function can be performed as described with reference to FIG. 2C.

Referring to FIG. 3A, SF 152B is selected as the first service function. In this example, SF Spec. 152B is selected to be assigned to a host in the cloud infrastructure following the assignment of SF Spec. 152A to a host. In this example, SF Spec. 152B is not an initial service function to be placed on a host but instead a subsequent service function that is selected following the placement of SF Spec. 152A. In some embodiments, the selection of the service function 152B further includes the selection of the links that couple the service function with one or more other service functions. For example, the links may include the link 152B-152A, the link 152B-152C, and the link 152B-152D. In some embodiments, only a subset of these links may be selected, for example, the link 152B-152A may be selected as a result of the service function 152A being already assigned to a host and the links 152B-152C and 152B-152D may not be selected as service functions 152C and 152D may not have been placed yet.

Referring back to FIG. 4A, the flow of operations then moves to operation 208, at which a set of the computing systems and a set of links are determined based on availability and characteristics of the computing systems and the links in the cloud infrastructure. The set of the computing systems are selected based on attributes of the computing systems such as geographic location, policies, ownership of the computing systems, as well availability of the computing systems. Referring to FIG. 3A, a set 223 which includes computing system 130B, computing system 130C, computing system 130D, and computing system 130N of the computing systems 130A-N is determined based on the availabilities and characteristics obtained at operation 404. For example, the characteristics and availability determined at operation 404 may indicate that the computing system 130A does not have capacity to support an additional service function as it is already selected to host the service function SF Spec. 152A. Other criteria can be used to determine the set of computing systems is selected. For example, the availability and characteristics of the computing systems 130A-N indicate the geographic location of each one of the computing systems and the selection of the set of computing systems 223 is performed based on their respective locations and the geographic location of the first service function. Additionally or alternatively, the selection of the set of computing systems 223 can be performed based on one or more attributes of the first service function and availability and characteristics of the computing systems. The determined sets of computing systems and links are candidates for hosting the first service function and its associated links. Further, in addition to selecting candidates which meet current capacity requirements, the elastic nature of the candidates is also considered too. The elastic nature of the candidate may include the possibility of having an increased capacity (of the link resources or the computing resources).

Figure 3B:
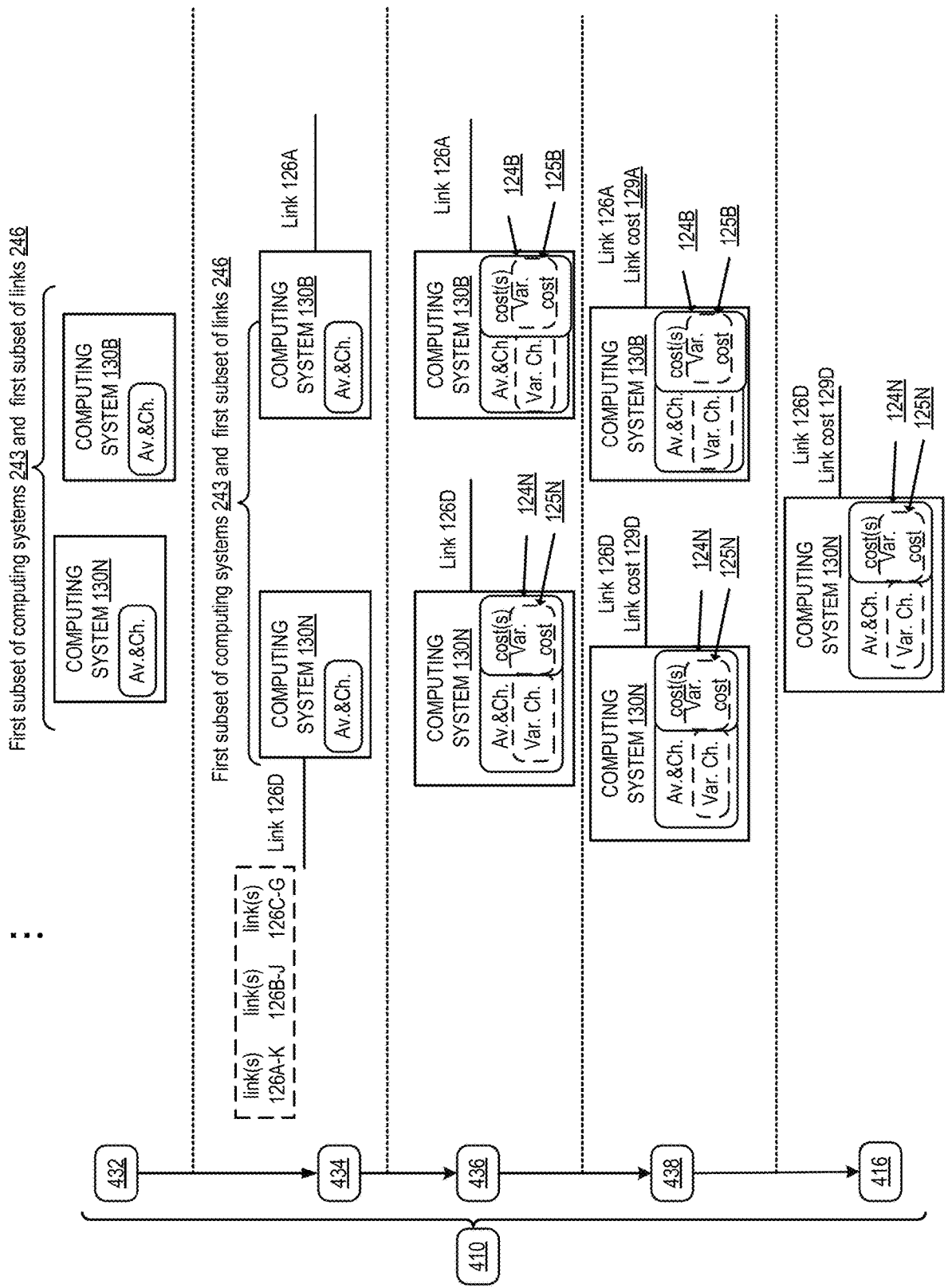
FIG. 3B a block diagram of exemplary cloud resources selected for a first service function, in accordance with some embodiments.

The flow of operations moves from operation 408 to operation 432. The following operations of FIG. 4A will be described with reference to FIG. 3B. At operation 432, a first subset of computing systems is determined from the first set of the computing systems that have a second set of attributes compatible with the first set of attributes of the first service function. In some embodiments, the second set of attributes of the first subset of computing systems is compatible with the attributes of the first service function when the computing requirements of deployment of the first service function are satisfied by the hardware and/or software resources of the computing systems. For example, the characteristics of the computing system may indicate that one or more versions of the service function are pre-loaded/registered with the computing system (e.g., 142A version 4.1 and version 3.3. are registered with the computing system 130A). Alternatively or additionally, the characteristics of the computing system may indicate whether or not some hardware implementations can be supported by the computing system (e.g., hardware acceleration, high performance, graphics processing unit (GPU) implementation, etc.). The flow then moves to operation 434, at which a first subset of a first set of links is determined. The first subset of links has a first set of link attributes compatible with the first set of attributes of the first service function is determined. In some embodiments, the link attributes of the subset of links is compatible with the attributes of the first service function when the networking requirements of deployment of the first service function are satisfied by the subset of the links. For example, the subset of links may satisfy bandwidth, latency and/or geographical location required for the service function. Additionally or alternatively, the subset of links may satisfy network, communication, and security protocols requirements of the first service function. With reference to FIG. 3B, the subset of computing systems includes system 130N and system 130B. Each of the systems is able to host the service function as defined with service function specification 152B as each of the two computing systems includes an indication that SF 142B with Hardware acceleration is supported. The first subset of links may include the link 126A for the computing system 130B. The first subset of links may include the links 126D for the computing system 130B. In some embodiments, the first subset of links may further include one or more of the links 126C-G, 126B-J, and 126A-K.

At operation 436, for each one of the first subset of computing systems an associated cost for deployment of the first service function is determined. The associated cost includes one or more varying costs for usage of the computing system based on the varying characteristics. For example, for each one of the subset of computing systems 130B and 130N an associated cost (cost 124B and cost 124N respectively) is determined, which includes a varying cost (var. cost 125B and var. cost 125N). The cost can be a reward associated with the placement of the service function at a computing system. Alternatively and additionally, the cost can be a fee to be paid by a customer and/or service provider for the placement of the service function at the computing system. Cost 124N corresponds to the cost of assigning or placing the service function specification 152B onto the computing system 130N and cost 124B corresponds to the cost of assigning or placing the service function specification 152B onto the computing system 130B. Varying cost 125B corresponds to the cost of assigning or placing service function specification 152B onto the computing system 130B for one or more capacity variations of the computing system. Varying cost 125N corresponds to the cost of assigning or placing service function specification 152B onto the computing system 130N for one or more capacity variations of the computing system.

The flow then moves to operation 438 at which for each of the first subset of links an associated link cost is determined. The link cost is associated with the deployment of the first service function. The associated link cost may also include one or more varying costs for usage of the computing system based on the varying characteristics. Cost 129A is associated with the selection of link 126A and cost 129D is associated with the selection of link 126D. The flow then moves to operation 439, at which the first computing system and the one or more links are selected based on the associated costs and the associated link costs. The subset of computing system 243 and the subset of links 246 are ranked based on the costs (cost 124B, which includes the varying cost 125B, cost 124N, which includes the varying cost 125B, cost 129A, which may include a varying link cost (not illustrated), link cost 129D, which may include a varying link cost (not illustrated)).

Different ranking mechanisms can be used without departing from the scope of the present embodiments. For example, the computing systems and links can be ranked in a decreasing order based on a cost of using the resources. In some embodiments, the total cost of each cloud resource is evaluated, considering the connection costs, service function deployment costs, and varying capacity costs. The varying capacity costs represent costs of the potential infrastructure reconfiguration due to resource elasticity. In some embodiments, the service orchestrator 122 may use a greedy mechanism for selecting the cheapest option.

Alternatively or additionally, the computing systems and links can be ranked based on a reward that is allocated to the customer and/or service provider for using the resources. Based on this ranking the computing system 130B and the link 126B are selected for the placement of the first service function 152B. The computing system 130B is compatible with the attribute of the first service function 152B and is operative to host this service function. For example, the computing system 130B is operative to support a version of service function 142B with hardware acceleration as well as a version of 142B with CPU implementation only. Each of these version being associated with a respective cost. This is compatible with the attributes of the first service function specification 152B which indicate the need for hardware acceleration instantiation.

The flow of operations then moves to operation 429 at which a first computing system from the first subset of computing systems and zero or more links are selected based on the associated costs and the associated link costs for the first service function. The operations 432-439 are operations performed for selecting a first computing system of the set of computing systems to be assigned to host the first service function and one or more links that are to be used to couple the first computing system with one or more other ones of the computing systems based on the first service function specification.

Figure 4B:
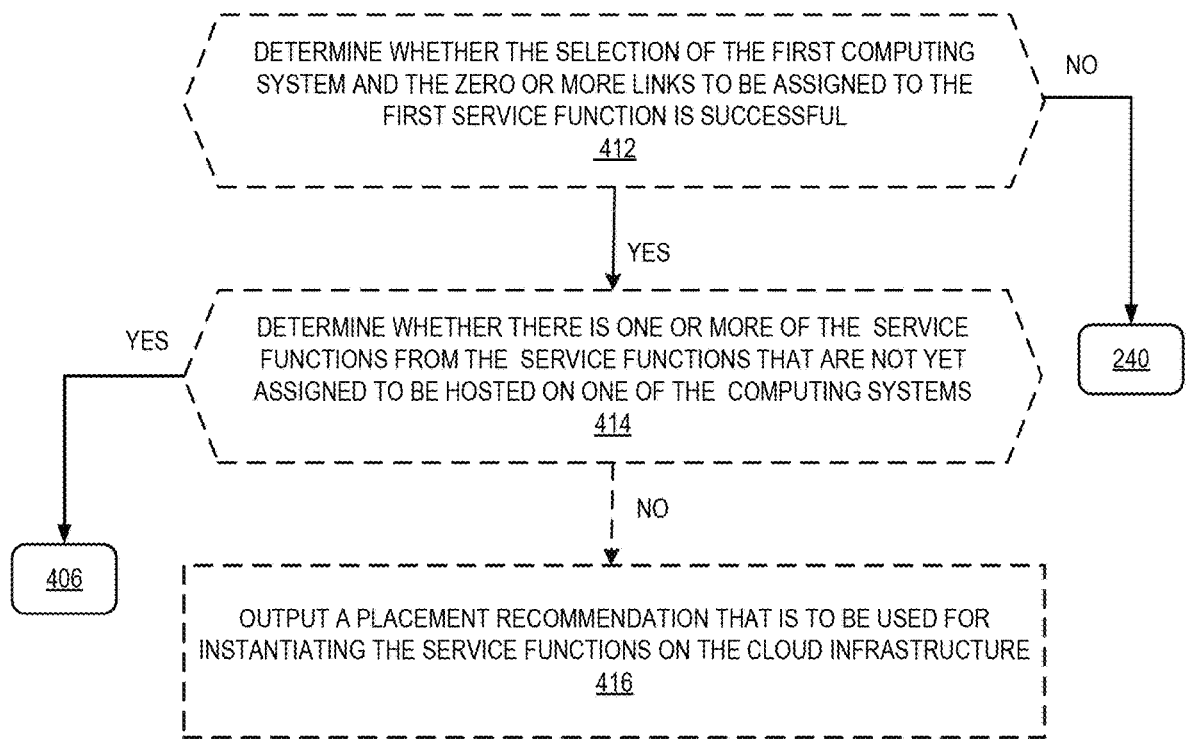
FIG. 4B illustrates a flow of operations performed for placement of multiple service functions, in accordance with some embodiments.

FIG. 4B illustrates a flow of operations performed for placement of multiple service functions, in accordance with some embodiments. Following the selection of the first computing system and the zero or more links for the first service function, one or more additional operations can be performed in order to obtain a placement recommendation for the service functions that form the virtualized service. In some embodiments, the flow of operations may include operation 412, at which a determination of whether the selection of the first computing system and the zero or more links to be assigned to the first service function is successful is performed.

In some embodiments, determining that the selection is successful includes a determination that the selected first computing system and/or the zero or more links have attributes that are compatible with the attributes of the first service function. In other words, for the selection to be successful, the first computing system and the zero and more links need to be capable of supporting deployment of the first service function. In some embodiments, the selection may not be successful, in that case the flow of operations moves to operation 240. Upon determining that the selection is successful, the flow of operations moves to operation 414.

At operations 414, a determination of whether one or more of the service functions from the service functions are not yet assigned to be hosted on one of the computing systems is performed. In response to determining that there is one or more of the service functions that are not yet assigned to be hosted on one of the computing systems, the flow of operations moves to operation 206, and operations 206-214 are repeated until it is determined that all of the service functions that form the virtualized service are assigned to computing systems with links that couple the service functions, infrastructure ports, or user equipment (UE) attachment points. For example, upon assignment of the first service function 152N to the computing system 130N with the link 126D, the next service function is selected to be placed on the cloud infrastructure. The next service function is one of the remaining non-assigned service functions 152C-G. For example, the next service 152C can be selected.

Alternatively, responsive to determining that all of the service functions are assigned to a second set of computing systems in the cloud infrastructure, a placement recommendation is output. The placement recommendation is to be used for determining a deployment plan for instantiating the service functions on the cloud infrastructure. The placement recommendation indicates for each one of the service functions a corresponding one of the second set of computing systems and a second set of links from the one or more links that couple the second set of computing systems. The second set of links may construct a path between computing systems. The placement recommendation 170 includes a re-dimensioning recommendation. The placement recommendation 170 includes an indication of the assignment of each one of the service functions 152A-G onto one or more computing systems 130A-N of the cloud infrastructure. The placement recommendation can then be used to determine a deployment plan 171. The deployment plan 171 is then used by one or more cloud infrastructure managers to instantiate the virtualized service on the cloud infrastructure. The instantiation of the virtualized service may include transmitting detailed steps to each one of the infrastructure managers for instantiating the service functions as defined by their respective service function specifications.

Cost Models for Selection of the Cloud Resources for Placement of a Service Function:

As described above each cloud resource (computing resource or network resource) has an associated cost for a given set of attributes. The cost can be determined based on the service agreement (e.g., SLA) established between the service provider and the infrastructure provider(s). The cost information can be obtained upon determination of the availability and characteristics of the cloud resources (operation 404 or operation 204).

In some embodiments, there are multiple types of costs that can be considered when determining the placement for a service function. A first cost is the cost of deployment of the service function. This cost is the administrative cost of instantiating a given type of service function with given service function specification for a given amount of time and availability on a given computing system. This cost can be referred to as the service function deployment cost. A second cost can be a connection cost. The connection cost is the administrative cost of using one or more link(s) (e.g. L3VPN tunnel) which connects two service functions on given computing systems with determined link attributes and for a given amount of time. The connection cost may include a total cost of multiple consecutive links (e.g., tunnels). A third cost can be a cost of varying resources. The cost of varying resources is the administrative cost of creating a given amount of additional capacity on a cloud resource, including reconfiguration of a link, scaling-up the CPU count of the computing system, scaling-up the storage usage in a computing system, the possible termination of workload with lower priority, etc.

The service orchestrator 122 is operative to use a sum of two or more of these costs (service function deployment cost, connection cost, and cost of varying resources) when selecting the first computing system and the zero or more links for a first service function (at operation 210 or at operation 439) for the placement of the service function.

In some embodiments, determining the cloud resources for placing a service function may be based on a cost of selection of the cloud resource with a fixed capacity. In other embodiments, determining the cloud resources for placing the service function may be based on the cost of selection as well as a reconfiguration/re-dimensioning cost. The reconfiguration cost is the cost associated with the cost of reconfiguration of the cloud resource when changing from a current capacity (compute, storage, or network capacity) to a new capacity. We describe the Resource Elasticity Characteristic of a scalar capacity type of resource with three components:

$$\text{The inventory element reconfiguration cost} = CCF(NC-BC) - CCF(CC-BC) \quad (1)$$

Where CCF(x) indicates the cost value of CCF at additional capacity x. Base Capacity (BC) indicates a starting point of a capacity cost function. In some embodiments, capacity usage of up to the base capacity does not require resource elasticity, thus no inventory reconfiguration cost might occur. Capacity Cost Function (CCF): defines the administrative price of creating a given amount of additional capacity above the Base Capacity. The CCF incorporates all costs incurred to make the reconfiguration from a current capacity to a new capacity happen and make the capacity available for usage by a service. Every capacity value above the highest additional capacity has infinite cost (rendering that amount of capacity increase infeasible). Current Capacity (CC): gives the currently active capacity of a cloud resource, which is above the Base Capacity. If the Current Capacity should be increased to a higher value, the price of the reconfiguration is given by the cost difference of the current and new capacity defined by the Capacity Cost Function.

Figure 5A:
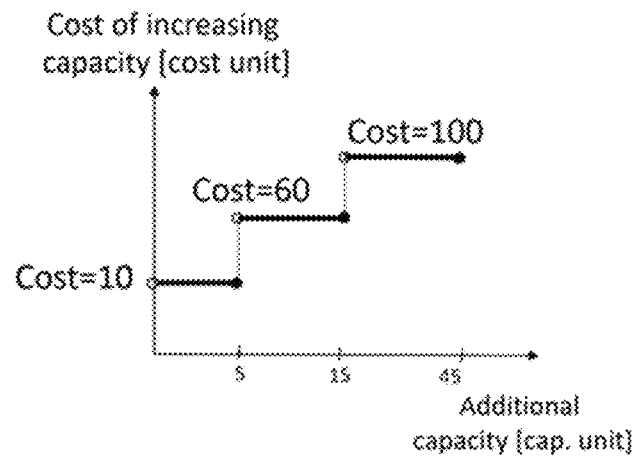
FIG. 5A illustrates an exemplary stepwise capacity cost function that can be in some embodiments.

In some embodiments, the capacity cost function can be a stepwise real value function, where each step refers to a quantum of cloud resource elasticity in the cloud infrastructure. FIG. 5A illustrates an exemplary stepwise capacity cost function that can be in some embodiments. The horizontal axis represents the additional units of capacity compared to the base capacity and the vertical axis represents the cost of the amount of additional capacity in cost units. The capacity cost function of FIG. 5A can be used to determine the varying characteristics and cost for link bandwidth capacity. In one example, the base capacity of a link L3VPN_1 can be 5 Gbps, the corresponding capacity cost function is shown in FIG. 5, having capacity unit to be Gbps and cost unit to be $. If the Current Capacity of L3VPN_1 is 10 Gbps, and a reconfiguration to 20 Gbps is needed, its cost would be the difference of CCF at the new capacity and CCF at the current capacity (substituting to Equation 1):

$$CCF(NC-BC)-CCF(CC-BC)=CCF(20\ Gbps-5\ Gbps)-CCF(10\ Gbps-5\ Gbps)=60\$-10\$=50\$$$

This varying cost is taken into consideration at the time of selection of the network resource for a service function.

Figure 5B:
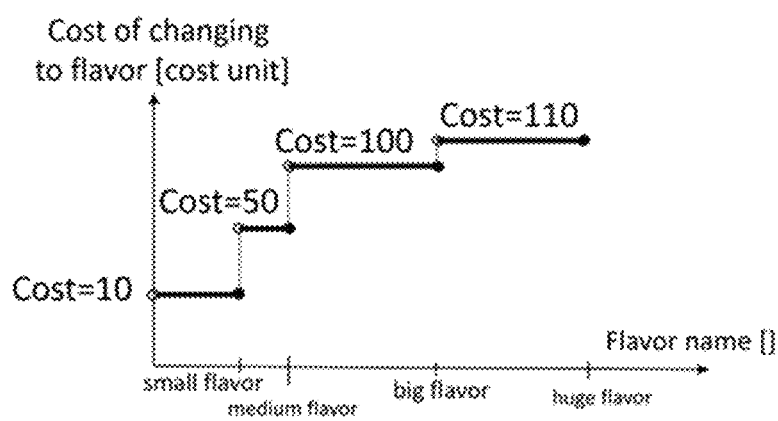
FIG. 5B illustrates another exemplary capacity cost function in accordance with some embodiments.

FIG. 5B illustrates another exemplary capacity cost function in accordance with some embodiments. The example of FIG. 5B illustrates a composite cost functions that represents costs of increasing flavors of a computing system with multiple types of computation resources (e.g. CPU, memory, disk, I/O). For example, a current active flavor of the computing system wouldn't provide sufficient resources for placing a service function, the service orchestrator may consider among the candidate computing systems using the system with CCF of FIG. 5B based on the varying resource capacity.

Architecture

Figure 6:
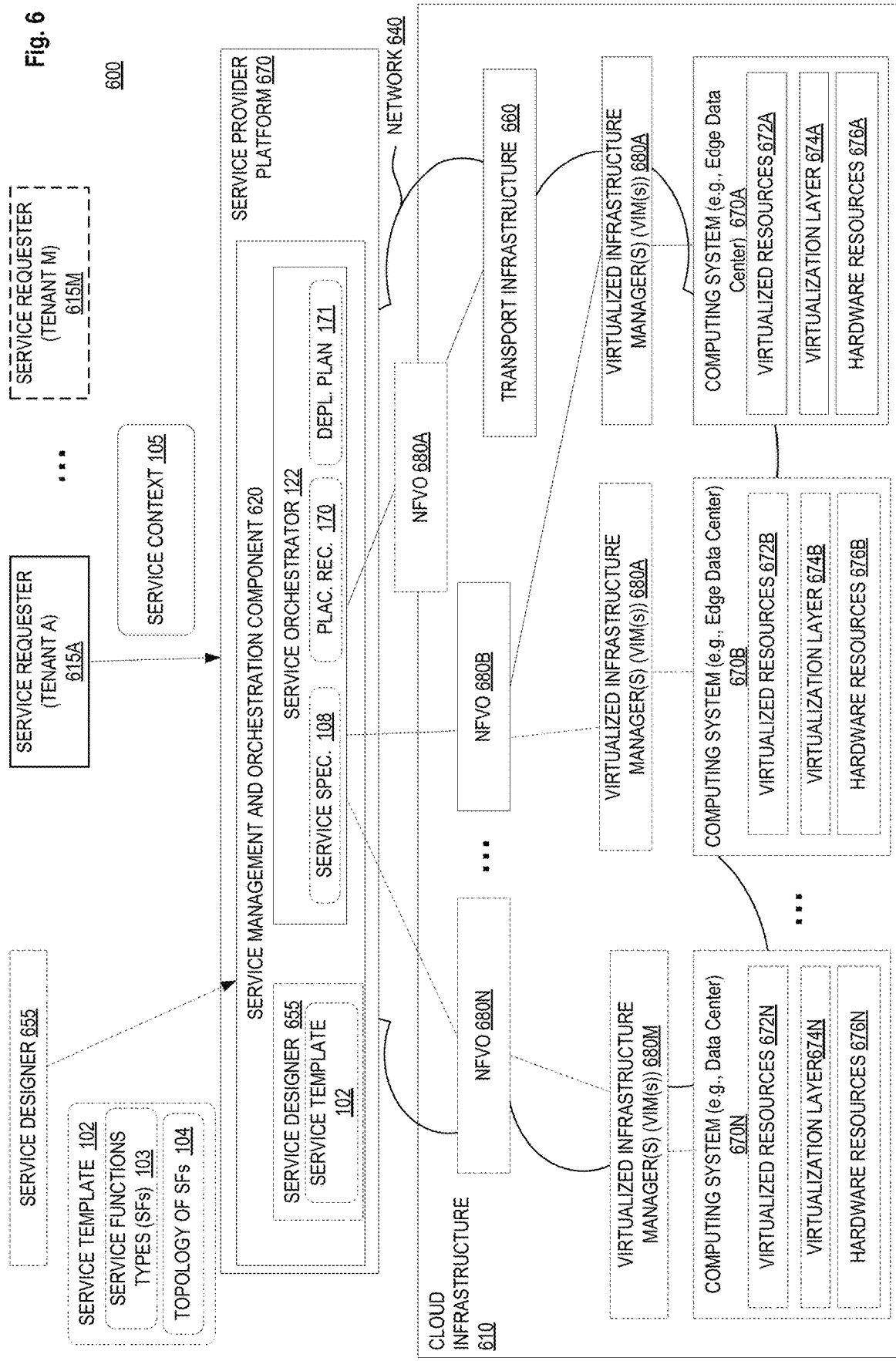
FIG. 6 illustrates a block diagram of an exemplary virtualized service deployment system in accordance with some embodiments.

FIG. 6 illustrates a block diagram of an exemplary virtualized service deployment system in accordance with some embodiments. The system 600 includes a cloud infrastructure 610 and a service management and orchestration system 620. The service management and orchestration component 620 is part of a service provider platform 670. The service provider platform 670 includes several components (that can be implemented on one or more network devices) for offering one or more virtualized services to service requesters. In some embodiments, the service provider platform 670 is a multi-tenant system that provides services to multiple tenants across a distributed cloud infrastructure with various geographically distributed sites. The service management and orchestration component 620 is operative to enable automatic deployment of a virtualized service on the cloud infrastructure 610. The virtualized service typically includes a set of service functions. The requested service satisfies a particular business need and adheres to policies that define operational characteristics and access controls/security. In some embodiments, the service functions may include network functions such as firewall, load balancer, Deep Packet Inspection (DPI), http header enrichment, Network Address Translation (NAT), etc. These service functions are typically linked to form the service and the linking of these functions can be referred to as Service Chaining.

The cloud infrastructure 610 includes computing resources (e.g., computing systems 670A-N) and network resources (e.g., physical transport infrastructure). Each of the computing systems includes virtualized resources 672A-N, a virtualization layer 674A-N, and hardware resources 676A-N. The virtualization layer(s) 674A-N abstracts the hardware resources 676A-N and provides the hardware resources 676A-N as virtualized resources 672A-N to the virtual functions so that the virtual functions can be executed. The virtualization layer(s) 674A-N thus abstracts and decouples the virtual functions from the underlying hardware. In one embodiment, the virtualization layer(s) x74A-N is implemented as a hypervisor (also known as a virtual machine monitor (VMM)) that allows one or more virtual functions to share the hardware resources 676A-N. In some embodiments, each one of the computing systems is a network device as described in further details below. Alternatively, each of the computing systems can be a data center including several network devices. The service orchestrator 622 is operative to perform the embodiments described with reference to FIGS. 1A-G, 2A-F, 3A-B, 4A-B. Each of the service orchestrator 122, the service management and orchestration component 620, and the service provider platform 670 can be implemented on one network device or distributed over multiple network device. Each of the network function virtualization orchestrator (NFVOs) 680A-N and the virtualized infrastructure managers (VIMs) 670A-N can be implemented on one network device or alternatively distributed over multiple network devices.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7A:
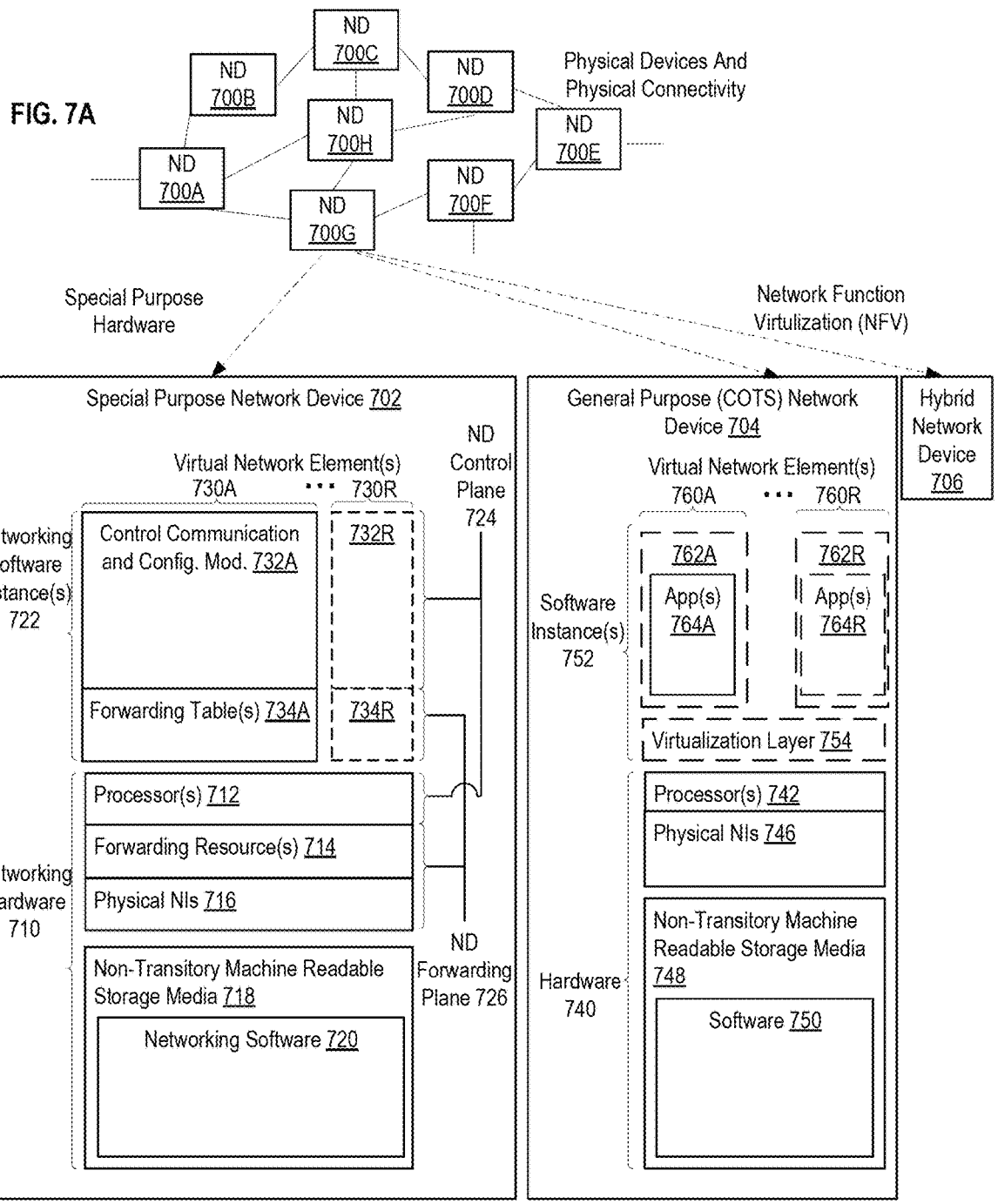
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general-purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
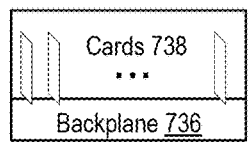
FIG. 7B illustrates an exemplary way to implement a special-purpose network device according to some embodiments of the invention.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general-purpose network device 704 includes hardware 740 comprising a set of one or more processor(s) 742 (which are often COTS processors) and physical NIs 746, as well as non-transitory machine-readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
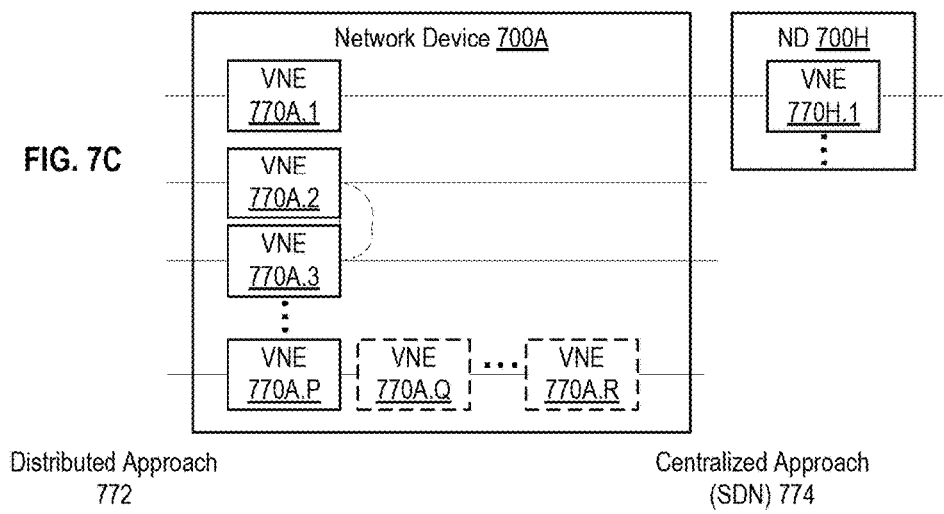
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on an NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
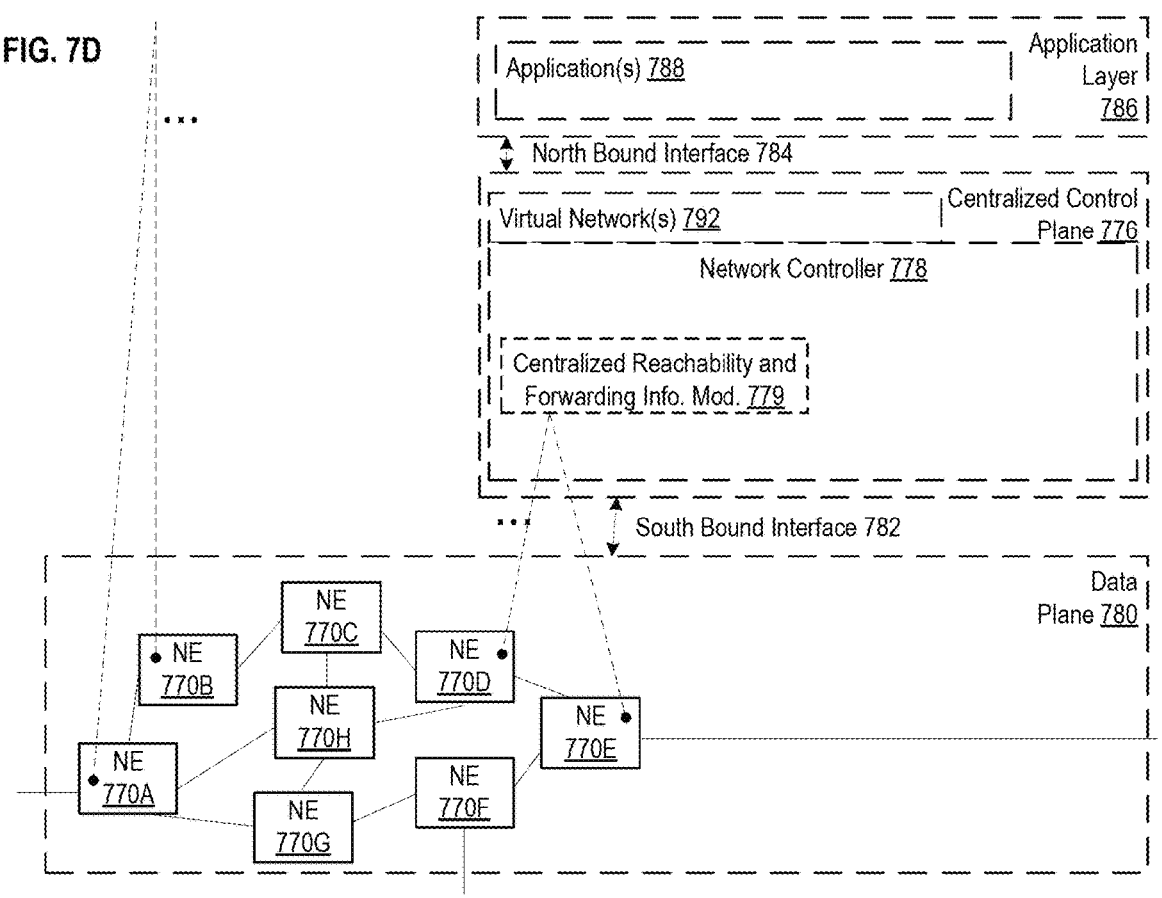
FIG. 7D illustrates a network with a single network element (NE) on each of the NDs, and within this straightforward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straightforward approach contrasts a traditional distributed approach (commonly used by traditional routers) with a centralized approach for maintaining reachability and forwarding information (also called network control), according to some embodiments. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as an SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
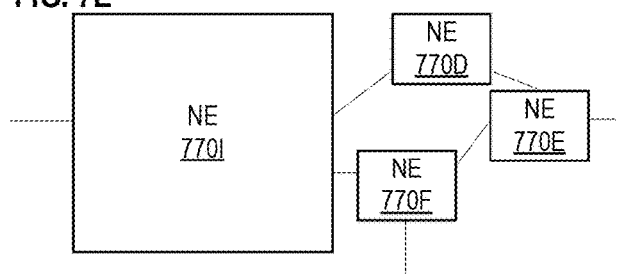
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
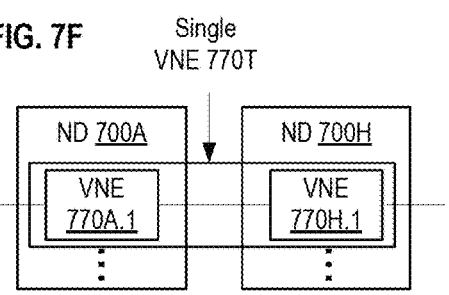
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software.

A virtual circuit (VC), synonymous with virtual connection and virtual channel, is a connection-oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection-oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. The sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection-oriented packet switching, meaning that data is always delivered along the same network path, i.e. Through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of deployment of a virtualized service on a cloud infrastructure that includes computing systems and network resources coupling the computing systems, the method comprising:
  (a) determining availability and characteristics of one or more of the computing systems and the network resources, wherein the characteristics include varying characteristics which define potential capacity modifications of the computing systems and the network resources of the cloud infrastructure;
  (b) determining, based on the availability and characteristics of the computing systems and the network resources in the cloud infrastructure, a set of the computing systems and a set of links from the network resources that are candidates for hosting a first service function from service functions that form a virtualized service;
  (c) determining a first subset of the set of the computing systems that have second sets of attributes compatible with a first set of attributes of the first service function, wherein the second sets of attributes include an indication of whether a computing system supports one or more hardware implementations including hardware acceleration; and
  (d) determining a first subset of links from a first set of links that have first sets of link attributes compatible with the first set of attributes of the first service function;
  (e) determining for each computing system of the first subset of the computing systems an associated cost for deployment of the first service function, wherein the associated cost includes one or more varying costs for usage of the computing system based on the potential capacity modifications;

(f) determining for each link of the first subset of links an associated link cost for deployment of the first service function, wherein the associated link cost includes one or more varying link costs for usage of the link based on the potential capacity modifications; and (g) selecting a first computing system from the first subset of the computing systems and one or more links of the first subset of links based on the associated costs and the associated link cost for placing the first service function in the cloud infrastructure.

2. The method of claim 1 further comprising:

(h) responsive to determining that there is one or more of the service functions that are not yet assigned to be hosted on one of the computing systems, repeating (c) to (g); and (i) responsive to determining that all of the service functions are assigned to be hosted on a second set of computing systems in the cloud infrastructure, outputting a placement recommendation that is to be used for determining a deployment plan for instantiating the service functions on the cloud infrastructure, wherein the placement recommendation indicates for each one of the service functions a corresponding one of the second set of computing systems and a second set of links from the one or more links that couple the second set of computing systems.

3. The method of claim 1 further comprising:

receiving a request to deploy the virtualized service, wherein the request includes service function specifications that define the service functions forming the virtualized service.

4. The method of claim 1 further comprising:

selecting a first service function specification of the first service function from service function specifications that define the service functions that form the virtualized service.

5. An article of manufacture for deployment of a virtualized service on a cloud infrastructure that includes computing systems and network resources coupling the computing systems, the article of manufacture comprising:

a non-transitory machine-readable storage medium that provides instructions that, if executed by a processor, will cause the processor to:

(a) determine availability and characteristics of one or more of the computing systems and the network resources, wherein the characteristics include varying characteristics which define potential capacity modifications of the computing systems and the network resources of the cloud infrastructure;

(b) determine, based on the availability and characteristics of the computing systems and the network resources in the cloud infrastructure, a set of the computing systems and a set of links from the network resources that are candidates for hosting a first service function from service functions that form a virtualized service;

(c) determine a first subset of the set of the computing systems that have second sets of attributes compatible with a first set of attributes of the first service function, wherein the second sets of attributes include an indication of whether a computing system supports one or more hardware implementations including hardware acceleration; and (d) determine a first subset of links from a first set of links that have first sets of link attributes compatible with the first set of attributes of the first service function;

(e) determine for each computing system of the first subset of the computing systems an associated cost for deployment of the first service function, wherein the associated cost includes one or more varying costs for usage of the computing system based on the potential capacity modifications:

(f) determine for each link of the first subset of links an associated link cost for deployment of the first service function, wherein the associated link cost includes one or more varying link costs for usage of the link based on the potential capacity modifications; and (g) select a first computing system from the first subset of the computing systems and one or more links of the first subset of links based on the associated costs and the associated link cost for placing the first service function in the cloud infrastructure.

6. The article of manufacture of claim 5, wherein the processor is further to:

(h) responsive to determining that there is one or more of the service functions that are not yet assigned to be hosted on one of the computing systems, repeating (c) to (g); and (i) responsive to determining that all of the service functions are assigned to be hosted on a second set of computing systems in the cloud infrastructure, outputting a placement recommendation that is to be used for determining a deployment plan for instantiating the service functions on the cloud infrastructure, wherein the placement recommendation indicates for each one of the service functions a corresponding one of the second set of computing systems and a second set of links from the one or more links that couple the second set of computing systems.

7. The article of manufacture of claim 5, wherein the processor is further to:

receiving a request to deploy the virtualized service, wherein the request includes service function specifications that define the service functions forming the virtualized service.

8. The article of manufacture of claim 5, wherein the processor is further to:

selecting a first service function specification of the first service function from service function specifications that define the service functions that form the virtualized service.

9. A non-transitory machine-readable storage medium comprising computer program code which when executed by a computer carries out the method including the following operations:

(a) determining availability and characteristics of one or more of the computing systems and the network resources, wherein the characteristics include varying characteristics which define potential capacity modifications of the computing systems and the network resources of the cloud infrastructure;

(b) determining, based on the availability and characteristics of the computing systems and the network resources in the cloud infrastructure, a set of the computing systems and a set of links from the network resources that are candidates for hosting a first service function from service functions that form a virtualized service;

(c) determining a first subset of the set of the computing systems that have second sets of attributes compatible with a first set of attributes of the first service function, wherein the second sets of attributes include an indication of whether a computing system supports one or more hardware implementations including hardware acceleration; and (d) determining a first subset of links from a first set of links that have first sets of link attributes compatible with the first set of attributes of the first service function;

(e) determining for each computing system of the first subset of the computing systems an associated cost for deployment of the first service function, wherein the associated cost includes one or more varying costs for usage of the computing system based on the potential capacity modifications;

(f) determining for each link of the first subset of links an associated link cost for deployment of the first service function, wherein the associated link cost includes one or more varying link costs for usage of the link based on the potential capacity modifications; and (g) selecting a first computing system from the first subset of the computing systems and one or more links of the first subset of links based on the associated costs and the associated link cost for placing the first service function in the cloud infrastructure.

10. A non-transitory machine-readable storage medium of claim 9, wherein the operations further comprise:

(h) responsive to determining that there is one or more of the service functions that are not yet assigned to be hosted on one of the computing systems, repeating (c) to (g); and (i) responsive to determining that all of the service functions are assigned to be hosted on a second set of computing systems in the cloud infrastructure, outputting a placement recommendation that is to be used for determining a deployment plan for instantiating the service functions on the cloud infrastructure, wherein the placement recommendation indicates for each one of the service functions a corresponding one of the second set of computing systems and a second set of links from the one or more links that couple the second set of computing systems.

11. The non-transitory machine-readable storage medium of claim 9, wherein the operations further comprise:
receiving a request to deploy the virtualized service, wherein the request includes service function specifications that define the service functions forming the virtualized service.

12. The non-transitory machine-readable storage medium of claim 9, wherein the operations further comprise:
selecting a first service function specification of the first service function from service function specifications that define the service functions that form the virtualized service.

* * * * *